(12) United States Patent
Jardin

(10) Patent No.: US 7,177,874 B2
(45) Date of Patent: Feb. 13, 2007

(54) SYSTEM AND METHOD FOR GENERATING AND PROCESSING RESULTS DATA IN A DISTRIBUTED SYSTEM

(76) Inventor: Cary A. Jardin, 12662 Sabre View Cove, San Diego, CA (US) 92128

( * ) Notice: Subject to any disclaimer, the term of this patent is extended or adjusted under 35 U.S.C. 154(b) by 511 days.

(21) Appl. No.: 10/808,177

(22) Filed: Mar. 23, 2004

(65) Prior Publication Data

US 2004/0181523 A1 Sep. 16, 2004

Related U.S. Application Data

(63) Continuation-in-part of application No. 10/345,811, filed on Jan. 16, 2003, now abandoned, and a continuation-in-part of application No. 10/345,504, filed on Jan. 16, 2003, now abandoned.

(51) Int. Cl.
*G06F 17/00* (2006.01)
(52) U.S. Cl. .............. 707/100; 707/1; 707/6; 707/103 R; 707/200
(58) Field of Classification Search .......... 707/1, 707/2, 3, 4, 5, 6, 8, 10, 100, 101, 102, 103 R, 707/104.1, 201, 204; 365/202; 370/241, 370/465; 382/100, 137, 139; 705/10, 14; 709/226, 238; 711/157, 202; 715/756; 718/105
See application file for complete search history.

(56) References Cited

U.S. PATENT DOCUMENTS

| | | | | |
|---|---|---|---|---|
| 6,098,157 | A * | 8/2000 | Hsu et al. | 711/157 |
| 6,968,335 | B2 * | 11/2005 | Bayliss et al. | 707/10 |
| 7,054,852 | B1 * | 5/2006 | Cohen | 707/2 |
| 7,113,957 | B1 * | 9/2006 | Cohen et al. | 707/102 |
| 2004/0122845 | A1 * | 6/2004 | Lohman et al. | 707/102 |
| 2005/0060292 | A1 * | 3/2005 | Day et al. | 707/3 |

FOREIGN PATENT DOCUMENTS

| | | |
|---|---|---|
| EP | 1164498 A1 * | 12/2001 |
| EP | 1363189 A2 * | 11/2003 |
| WO | WO0102935 A2 * | 1/2001 |

OTHER PUBLICATIONS

Jaiwei et al., Join Index Hierarchy: An Indexing Structure for Efficient Navigation in Object-Oriented Database, IEEE, 1999, pp. 1-33.*

Taniar et al., Aggregate-Join Query Processing in Parallel Database System, IEEE, 2000, pp. 824-829.*

Mohammed et al., Novel Parallel Join Algorithms for Grid Files, IEEE, 1996, pp. 144-149.*

* cited by examiner

*Primary Examiner*—Shahid Alam
*Assistant Examiner*—Fred I. Ehichioya
(74) *Attorney, Agent, or Firm*—Procopio, Hargreaves & Savitch

(57) ABSTRACT

Embodiments of the systems and methods provide the superior performance of high-speed distributed processing in a clustered system environment. The distributed computing system stores data tables or distributes jobs or tasks on multiple processors that execute on one or more nodes. For the case of multiple nodes, the nodes communicate over an inter-nodal communication link, for example, via a proprietary communication protocol, or alternatively via a standard protocol such as SQL database command protocol. By distributing the data storage and task processing over a potentially large number of processors and nodes, the distributed computing system returns processing results to the requestor in significantly reduced times as compared to conventional computing systems.

21 Claims, 13 Drawing Sheets

SYSTEM AND METHOD FOR GENERATING AND PROCESSING RESULTS DATA IN A DISTRIBUTED SYSTEM

RELATED APPLICATIONS

This application is a continuation-in-part of, and claims priority to, U.S. patent application Ser. No. 10/345,811, filed Jan. 16, 2003 now abandoned and titled "SYSTEM AND METHOD FOR DISTRIBUTED DATABASE PROCESSING IN A CLUSTERED ENVIRONMENT," and U.S. patent application Ser. No. 10/345,504, filed Jan. 16, 2003 now abandoned and titled "SYSTEM AND METHOD FOR COOPERATIVE DATABASE ACCELERATION," which are hereby incorporated by reference in their entireties. This application is related to U.S. patent application Ser. No. 10/807,816 titled "SYSTEM AND METHOD FOR COOPERATIVE DATABASE ACCELERATION," U.S. patent application Ser. No. 10/808,199 titled "SYSTEM AND METHOD FOR DISTRIBUTED PROCESSING IN A NODE ENVIRONMENT," U.S. patent application Ser. No. 10/808,176 titled "SYSTEM AND METHOD FOR CONTROLLING PROCESSING IN A DISTRIBUTED SYSTEM," and U.S. patent application Ser. No. 10/808,175 titled "SHARED MEMORY ROUTER SYSTEM AND METHOD FOR NODE COMMUNICATION IN A DISTRIBUTED SYSTEM," which are filed on even date herewith and are all hereby incorporated by reference in their entireties.

BACKGROUND OF THE INVENTION

1. Field of the Invention

The present invention generally relates to distributed processing in computer systems. More particularly, the invention relates to systems and methods for increasing the performance of computer systems by distributing the data processing load among multiple processors in a clustered environment.

2. Description of the Related Technology

Database systems have become a central and critical element of business infrastructure with the development and widespread use of computer systems and electronic data. Businesses typically rely on computer databases to be the safe harbor for storage and retrieval of very large amounts of vital information. The speed and storage capacities of computer systems have grown exponentially over the years, as has the need for larger and faster database systems.

A database (DB) is a collection of information organized in such a way that a computer program can quickly access desired pieces of data. Traditional databases are organized by fields, records and tables or files. A field is a category or item of information, a record is one complete set of fields, and a table or file is a collection of records. For example, a telephone book is analogous to a table or file. It contains a list of records that is analogous to the entries of people or businesses in the phone book, each record consisting of three fields: name, address, and telephone number.

In its simplest form, a database is a repository for the storage and retrieval of information. The early database systems simply provided batch input command data for programs, and stored the programmatic output. As computing technologies have advanced greatly over the years, so too have database systems progressed from an internal function supporting the execution of computer programs to complex and powerful stand-alone data storage systems. Client applications executing on computer systems can connect to or communicate with the database system via a network, or by other programmatic means, to store and retrieve data.

A database management system (DBMS) can be used to access information in a database. The DBMS is a collection of programs that enables the entry, organization and selection of data in a database. There are many different types of DBMSs, ranging from small systems that run on personal computers to very large systems that run on mainframe computers or serve the data storage and retrieval needs of many computers connected to a computer network. The term "database" is often used as shorthand to refer to a "database management system."

While database system applications are numerous and varied, following are several examples:
  computerized library systems;
  automated teller machines and bank account data;
  customer contact and account information;
  flight reservation systems; and
  computerized parts inventory systems.

From a technical standpoint, DBMSs can vary widely. For example, a DBMS can organize information internally in a relational, network, flat, or hierarchical manner. The internal organization can affect how quickly and flexibly information can be extracted from the database system. A relational database is one which stores data in two or more tables and enables the user to define relationships between the tables. The link between the tables is based on field values common to both tables.

Requests for information from a database are often presented in the form of a query, which is essentially a stylized or structured question. For example, the following query requests all records from the current database table in which the NAME field is SMITH and the AGE field contains a number greater than 35.

SELECT ALL WHERE NAME="SMITH" AND AGE>35

The set of rules or standards for constructing queries is generally referred to as a query language. Different DBMSs support different query languages, although there is a semi-standardized query language called structured query language (SQL). In addition, more sophisticated languages for managing database systems are referred to as fourth generation languages, or 4GLs for short.

SQL is used to communicate with a database system. SQL is the ANSI (American National Standards Institute) standard language for relational database management systems. SQL statements are used to perform tasks such as update data on a database or retrieve data from a database. Although there are different variations or dialects of SQL, it is nevertheless the closest thing to a standard query language that currently exists. Some examples of relational database management systems that use SQL include the following: Oracle, Sybase, Microsoft SQL Server, Access, and Ingres. Although most database systems use SQL, many also have their own additional proprietary extensions that are usually only used on that system. However, the standard SQL commands such as "Select," "Insert," "Update," "Delete," "Create," and "Drop" can be used to accomplish most operations that the user needs to do with a database.

Distributed database systems are databases in which the data storage and processing load is spread out over multiple database systems and connected by a communication. Distributed databases enable multiple users on a network such as a local area network (LAN) to access the same database system simultaneously.

However, existing database systems are often the bottleneck of computer systems, and the ever-growing power and speed of modern computing systems exacerbate this problem as computer processors are able to receive and process data ever more quickly. Therefore, what is needed is a distributed database system that provides very high-speed data retrieval.

SUMMARY OF CERTAIN INVENTIVE ASPECTS

The systems and methods of the invention have many features, no single one of which is solely responsible for its desirable attributes. Without limiting the scope of the invention as expressed by the claims that follow, some prominent features will now be discussed briefly. After considering this discussion, and particularly after reading the section entitled "Detailed Description of Certain Embodiments," one will understand how the features of the system and methods provide advantages over traditional systems.

Embodiments of the present invention provide the superior performance of high-speed distributed computing systems in a clustered environment. The distributed computing system stores data tables or distributes jobs or tasks on multiple processors that execute on one or more nodes. For the case of multiple nodes, the nodes communicate over an inter-nodal communication link, for example, via a proprietary communication protocol, or alternatively via a standard protocol such as SQL database command protocol. By distributing the data storage and task processing over a potentially large number of processors and nodes, the distributed computing system returns processing results to the requestor in significantly reduced times as compared to conventional distributed computing systems.

Embodiments of the systems and methods include processing a query command in a distributed computing system in which a plurality of database tables are stored on a plurality of nodes. The systems and methods include storing a first database table and a second database table on a first node, and storing a third database table and a fourth database table on a second node. This also includes determining a first join table definition in response to a query command, the first join table definition identifying a subset of the first database table. Also included is generating a second join table definition in response to the query command, the second join table definition identifying a subset of the third database table. This further includes generating a first join table from the first database table in accordance with the first join table definition, and generating a second join table from the third database table in accordance with the second join table definition. Additionally included is comparing the second database table with the first join table to generate a first intermediate results file, and comparing the fourth database table with the second join table to generate a second intermediate results file. This also includes generating a final results file from the first intermediate results file and the second intermediate results file. Additionally, this can also include executing post-processing operations on the final results file and wherein the post-processing operations include removing duplicate matching records from the final results file.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

DETAILED DESCRIPTION OF CERTAIN EMBODIMENTS

The following detailed description is directed to certain specific embodiments of the invention. However, the invention can be embodied in a multitude of different ways as defined and covered by the claims. The scope of the invention is to be determined with reference to the appended claims. In this description, reference is made to the drawings wherein like parts are designated with like numerals throughout.

The distributed computing system described herein can be implemented in different embodiments as various modules as discussed in detail below. The components or modules can be implemented as, but are not limited to, software, hardware or firmware components, or any combination of such components, that perform certain functions, steps or tasks as described herein. Thus, for example, a component or module may include software components, firmware, microcode, circuitry, an application specific integrated circuit (ASIC), and may further include data, databases, data structures, tables, arrays, and variables. In the case of a software embodiment, each of the modules can be separately compiled and linked into a single executable program, or may be run in an interpretive manner, such as a macro. The functions, steps or tasks associated with each of the modules may be redistributed to one of the other modules, combined together in a single module, or made available in, for example, a shareable dynamic link library. Furthermore, the functionality provided for in the components or modules may be combined into fewer components, modules, or databases or further separated into additional components, modules, or databases. Additionally, the components or modules may be implemented to execute on one or more computers.

The distributed computing systems are described herein primarily in the example context of distributed database systems. However, other embodiments of the invention include many types of distributed task systems, for example, systems having disjoint, distributed processing of tasks, jobs, or operations. Generally, the distributed computing systems are configured to break jobs down into a series of smaller functions or tasks that can be distributed among processors or nodes of a distributed computing system. In such distributed systems, the data is usually disjoint in that a particular piece of data is primarily associated with a single processor at any point in time, and processors do not directly access the data of other processors. The distributed database systems described herein are only example embodiments of the distributed computing systems.

Figure 1:
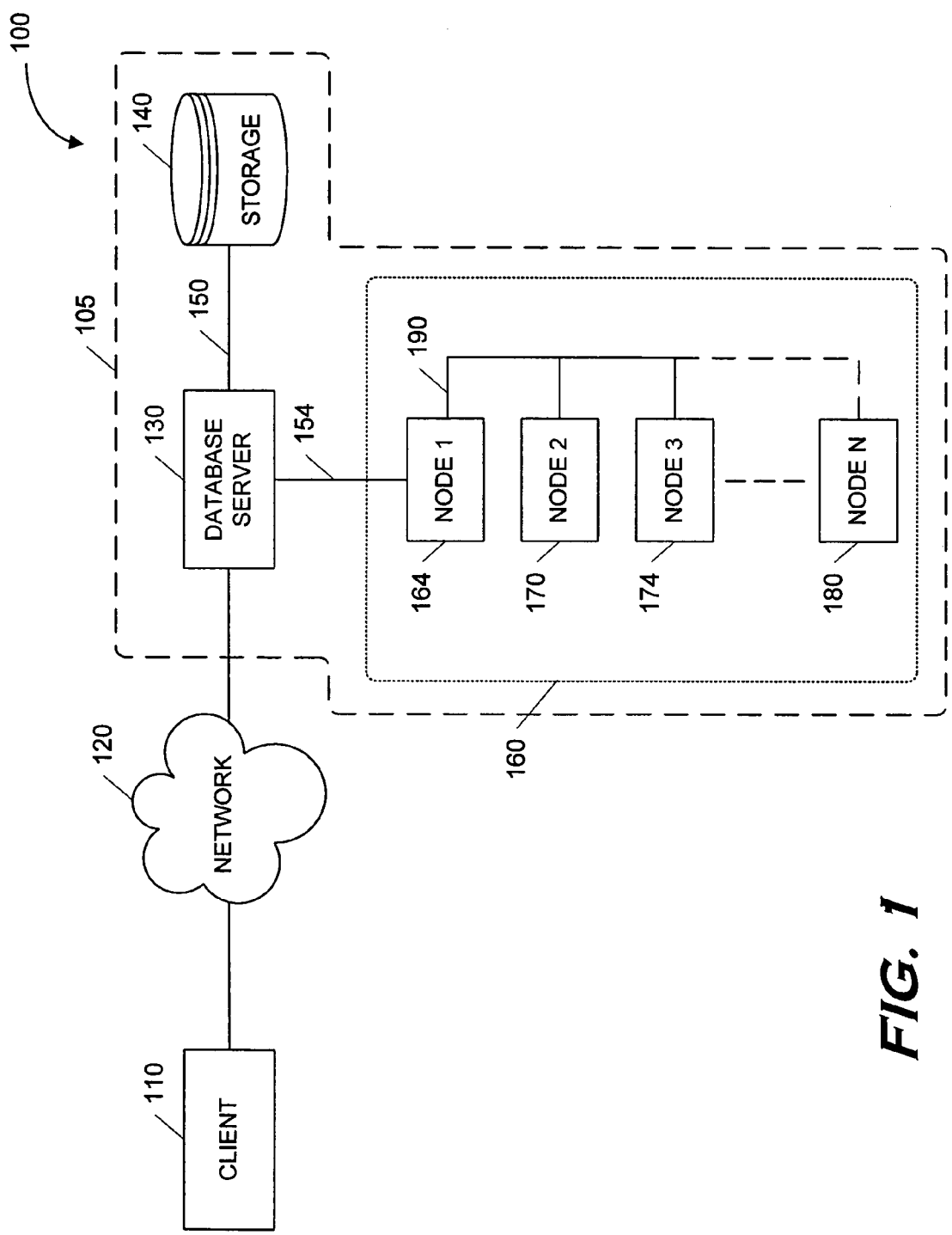
FIG. 1 is a block diagram illustrating one example of a database system.

Referring to the figures, FIG. 1 is a block diagram illustrating one example of a database system 100. The database system 100 includes an accelerated database system 105, which in turn includes a database (DB) server 130 that is connected to a persistent storage device 140 and a distributed database system 160 as shown in FIG. 1. The accelerated database system 105 can store data reliably and long-term on the persistent storage device 140, and simultaneously store data for fast retrieval on the distributed database system 160. In some embodiments, the DB server 130 stores data both on the persistent storage device 140 and on the distributed database system 160, such that the data stored on the databases are copies of one another. In this way, the accelerated database system 105 stores data reliably and retrieves data very rapidly. In other embodiments, the accelerated database system 105 does not include the persistent storage device 140 and data is stored just on the distributed database system 160.

The database system 100 can include a client computer system 110. The client computer system 110 can be one or more computers and associated input devices. The client computer system 110 is used by clients or users of the database system 100 to access the accelerated database system 105. The client can access the accelerated database system 105 by entering database commands and viewing database information in a logical and easy to use manner via a graphical user interface (GUI) that executes on the client computer system 110. The client computer system 110 can also employ other types of user interfaces, such as scripting language files or command line interfaces.

The DB server 130 can be implemented in a computer or a computer system. For example, such servers are available from Oracle and Microsoft. The DB server 130 receives database commands, for example, read and write commands, transmitted by the client computer system 110 via a network 120. The DB server 130 also determines whether to send the database commands to the persistent storage device 140, or to the distributed database system 160, or to both. The DB server 130 additionally receives responses from the database read commands, for example, results data from a database query command. The DB server 130 can be a SQL server that conforms or approximately conforms to the SQL standard for database query language. The database commands can be initiated by user input or other user actions on the client computer system 110, or programmatically generated by an application running on the client computer system 110.

The network 120 is represented in FIG. 1 as a cloud-shaped symbol to illustrate that a multitude of network configurations are possible and that the client computer system 110 and the DB server 130 can be indirectly connected via multiple server computers and network connections (not shown). Alternatively, the DB server 130 can be directly connected to the client computer system 110, or the DB server 130 can be incorporated within the client computer system 110, in which case the network 120 is not needed.

The DB server 130 communicates with the persistent storage device 140, if present, via a communication link 150. The communication link 150 can be a direct connection or a network connection. Characteristics of embodiments of the persistent storage device 140 include the capability to store data, for example, database entries or records, through cycles in power (e.g., power on/power off transitions) and for long periods of time in a reliable way. The persistent storage device 140 can be, for example, one or more computer hard disk drives, tape drives, or other long-term storage devices and combinations of the foregoing.

The accelerated database system 105 further includes the distributed database system 160 that communicates with the DB server 130 via a communication link 154. The distributed database system 160 provides distributed storage of database information and can provide very high-speed data retrieval. The distributed database system 160 can conform to a standard database protocol, for example, a SQL compliant database, in which case the distributed database system 160 can be directly connected to the network 120 without the use of the DB server 130. In one embodiment, the distributed database system 160 is a processor with a main memory. Alternatively, multiple processors, each with a main memory, can be used. The memory or data storage area of the distributed database system 160 can be, for example, solid state memory such as random access memory (RAM). In one embodiment, the memory of the distributed database system 160 is volatile memory, which means that stored data is lost when power is removed. Alternatively, the memory can be other types of volatile memory, as well as nonvolatile memory, such as a disk drive or a combination of volatile and nonvolatile memory. However, in the description that follows, only volatile memory examples are described, but both types of memory can be used. The communication link 154 can be an Ethernet network connection that conforms to the TCP/IP network protocol, for example, the Internet, a local area network (LAN), a wide area network (WAN), an Intranet, or other network links and protocols.

As shown in FIG. 1, the distributed database system 160 can include multiple nodes 164, 170, 174, 180 connected via an inter-nodal communication link 190. Each node can store a portion of the database information, for example, an approximately equal portion. High-speed retrieval can be improved when the nodes 164, 170, 174, 180 process database read commands simultaneously in a parallel fashion on the portion of the database stored at each of the nodes. The inter-nodal communication link 190 transfers data between the nodes 164, 170, 174, 180, and is preferably a high throughput, low latency communication interface link. The inter-nodal communication link 190 can be a commercially available communication link, or a custom-built, proprietary communication link. As designated by the label "NODE N" for the node 180, any number of nodes can be utilized, typically determined by the storage size and performance requirements of the particular database system. Alternatively, the distributed database system 160 can include only a single node, in which case the inter-nodal communication link 190 is not needed.

In embodiments having more than one node, one of the nodes communicates directly with the DB server 130 via the communication link 154. In this case, as shown in FIG. 1, the node 164 that communicates directly with the DB server 130 is referred to as the primary node. The nodes 170, 174, 180 in FIG. 1, referred to as secondary nodes, are not in direct communication with the DB server 130, but communicate with the other nodes and with the primary node 164 via the inter-nodal communication link 190. In other embodiments, multiple nodes 164, 170, 174, 180 can be connected to the DB server 130 via the communication link 154, up to a maximum of all the nodes. The internal components and functionality of the nodes are described in greater detail below.

Figure 2:
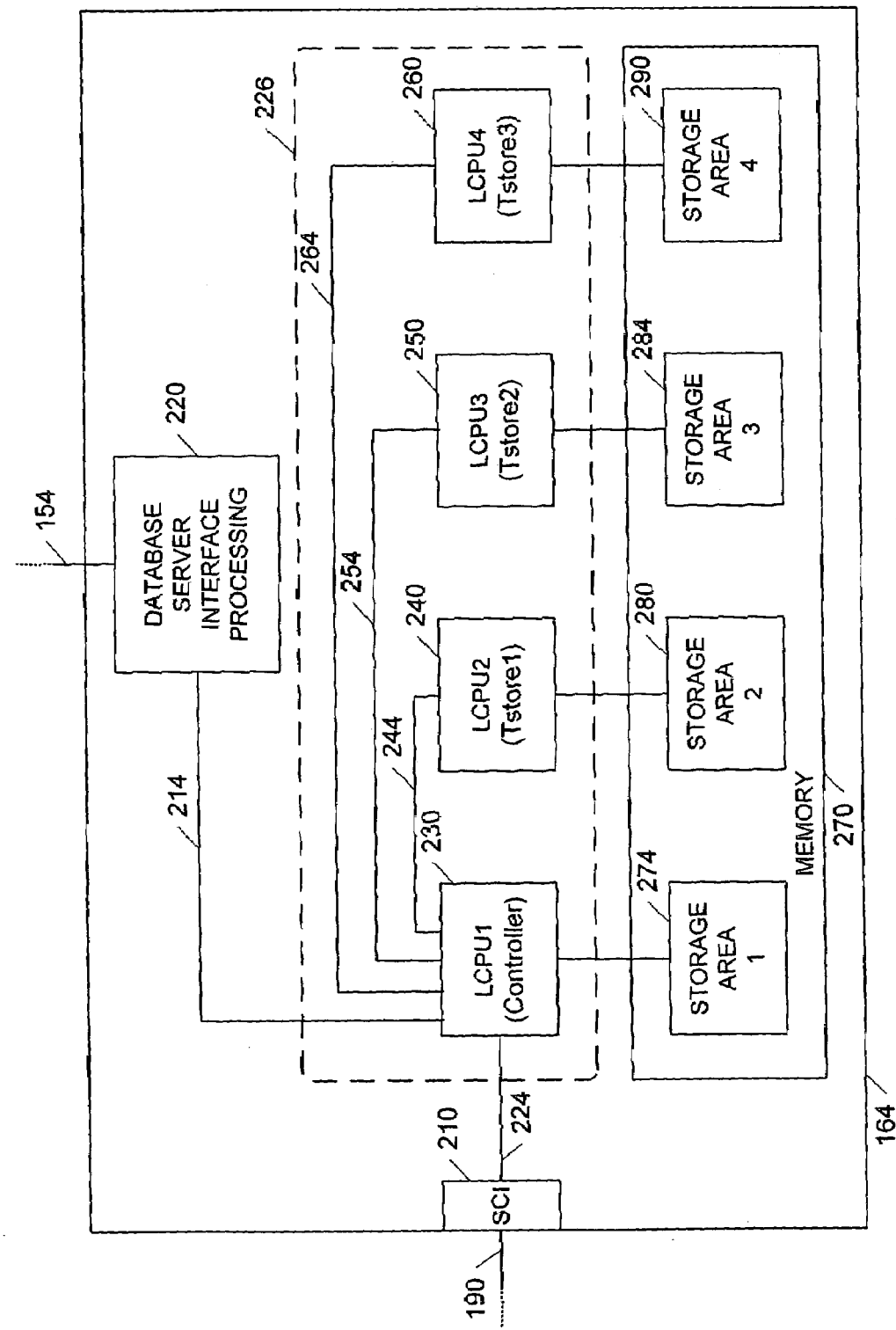
FIG. 2 is a block diagram illustrating components or modules of the nodes of the distributed database system shown in FIG. 1.

FIG. 2 is a block diagram illustrating components or modules of the nodes of the distributed database system 160 shown in FIG. 1. Except as noted, all of the nodes 1–N operate in the same manner and include the same elements. Therefore, the other nodes will not be described in detail. Each node can be a processor with a main memory. Alternatively, each node can be a computer with a main memory. The main memory can be segmented in multiple areas, physically or logically, as shown in FIG. 2.

A significant portion of the database storage and retrieval can be shared by the nodes, thereby distributing the data storage and processing load approximately equally among the nodes. The database storage and retrieval can be performed concurrently in a substantially parallel fashion by the nodes, thereby significantly increasing the performance of the distributed database system 160. In addition, the distributed database system 160 is easily expandable when additional performance is desired by simply adding nodes.

The primary node 164 includes a database server interface processing module 220 that communicates with the DB server 130 via the communication link 154. The database server interface processing module 220 transmits and receives data between the primary node 164 and the DB server 130 in conformance with the applicable communication protocol. The data received from the DB server 130 includes database commands and data to be stored by the distributed database system 160, and the data transmitted to the DB server 130 includes the results of database query commands. In embodiments in which only the primary node 164 communicates directly with the DB server 130, the secondary nodes 170, 174, 180 can be configured without the database server interface processing module 220. Alternatively, the database server interface processing module 220 can be included but not used in such embodiments to maintain commonality between the primary node 164 and the secondary nodes 170, 174, 180.

The primary node 164 communicates with the secondary nodes 170, 174, 180 that are present in the distributed database system 160 via the inter-nodal communication link 190, which is connected to a communication link interface module 210 that is in turn connected to a communication link 224. In some embodiments, the inter-nodal link 190 and the communication link interface module 210 conform to the Scalable Coherent Interface (SCI) protocol as specified by the. Institute of Electrical and Electronics Engineers (IEEE) 1596 standard. Other types of communication interface links can also be used for the inter-nodal communication of the nodes 164, 170, 174, 180 in the distributed database system 160. The inter-nodal communication link 190 can be, for example, fiber optic, Ethernet, small computer system interface (SCSI), VersaModule Eurocard bus (VME), peripheral component interconnect (PCI), or universal serial bus (USB).

The primary node 164 includes at least one processor represented by the dashed box 226 for performing at least some of the operations of the primary node 164. The processor 226 can be a general-purpose single- or multi-chip processor, or a special purpose processor such as an application specific integrated circuit (ASIC). The processor 226 can include at least one actual or physical processor and at least one logical processing unit or task. For example, in some embodiments, the processor 226 can include two or more physical processors for performing the operations of at least four logical central processing units (LCPU's). In such an example, the four logical central processing units shown in FIG. 2 are a first logical central processing unit (LCPU1) 230, a second logical central processing unit (LCPU2) 240, a third logical central processing unit (LCPU3) 250, and a fourth logical central processing unit (LCPU4) 260. Alternatively, each logical central processing unit can be implemented as a separate physical processor or different numbers of physical processors can be used to implement the logical central processing units and the modules depicted in FIG. 2. In addition, each logical central processing unit can be a virtual processor. The virtual processors can include programs, or programs not necessarily executing simultaneously.

An LCPU1 230 and an LCPU2 240 communicate with one another via a processor communication link 244. Similarly, the LCPU1 230 communicates with an LCPU3 250 via a processor communication link 254. The LCPU1 230 additionally communicates with an LCPU4 260 via a processor communication link 264. The LCPU1 230 communicates with the database server interface processing module 220 via a communication link 214. In the example shown in FIG. 2, the LCPU1 230 and the LCPU2 240 can be executed by a first physical processor (not shown), and the LCPU3 250 and the LCPU4 260 can be executed by a second physical processor (not shown). The LCPU1 230 communicates with the DB server 130 through the database server interface processing module 220. Other configurations of physical processors and logical processing units can be used, for example, with more or fewer physical processors and logical processing units.

The LCPU1 230 can also be referred to as the controller 230 to indicate that in some embodiments it performs some or all of the management and control operations of the primary node 164. The LCPU1 230 can additionally include the functionality of the database server interface processing module 220. The LCPU2 240 can also be referred to as the Tstore1 240, the LCPU3 250 can be referred to as the Tstore2 250, and the LCPU4 260 can be referred to as the Tstore3 260. The Tstore1 240, the Tstore2 250, and the Tstore3 260, each store a portion of the total database information in response to database write commands and respond to database read or query commands.

The Tstores 240, 250, 260 perform write operations, such as inserting, updating and deleting records from the Tstores' portion of the database. The Tstores 240, 250, 260 also perform read operations, such as receiving a database command or a data table, process data, and produce output based on the commands and the processing. For example, the Tstores 240, 250, 260 receive other Tstores' join tables, compare the join tables against the Tstore's own pivot table, and produce a corresponding intermediate results file. Although various types of data are described herein as being in the form of files, the data can also be in the form of data streams, raw data, or blocks of memory. The join tables, pivot tables, intermediate results files, and Tstore operation are described in more detail below.

The LCPU2 240, the LCPU3 250, and the LCPU4 260 are referred to as logical processing units or logical CPUs to indicate that each can execute on a separate physical CPU, or that multiple logical CPUs can execute on a single physical CPU. The logical CPUs can be thought of as a collection of functionally related tasks. FIG. 2 shows the LCPU1 230 communicating with the communication link interface module 210 to transmit and receive data via the inter-nodal communication link 190. Alternatively, the primary node 164 can be configured so that any of the logical processing units LCPU2 240, LCPU3 250, or LCPU4 260 of the processor 226 communicates with the communication link interface module 210.

In FIG. 2, each of the logical CPUs, LCPU1 230, LCPU2 240, LCPU3 250, and LCPU4 260, have an associated storage area in the memory 270 of the node 164. In some embodiments, the link between the processor 226 and the memory 270 can be the main memory bus of the processor, which provides high-speed memory data access. The LCPU1 230 stores data in an area of the memory 270 referred to as a storage area 1 274. The LCPU2 240 stores data in an area of the memory 270 referred to as a storage area 2 280. The LCPU3 250 stores data in an area of the memory 270 referred to as a storage area 3 284. The LCPU4 260 stores data in an area of the memory 270 referred to as a storage area 4 290.

The storage area 1 274, the storage area 2 280, the storage area 3 284, and the storage area 4 290 are shown in FIG. 2 as separate, non-contiguous, non-overlapping areas for ease of illustration. However, the actual physical locations of the storage area 1 274, the storage area 2 280, the storage area 3 284, and the storage area 4 290 may be contiguous or may overlap. Alternatively, there can be fewer or more data storage areas than those shown in FIG. 2. For example, there can be only one storage area that is shared by all the processors or tasks, or each processor or task can have multiple memory storage areas. In this example, the memory 270 is random access memory (RAM) such as static RAM (SRAM) or dynamic RAM (DRAM). However, other types of data storage can be utilized, such as flash memory or read-only memory (ROM). Alternatively, the data storage can be nonvolatile memory, or a combination of volatile memory and nonvolatile memory.

Figure 3:
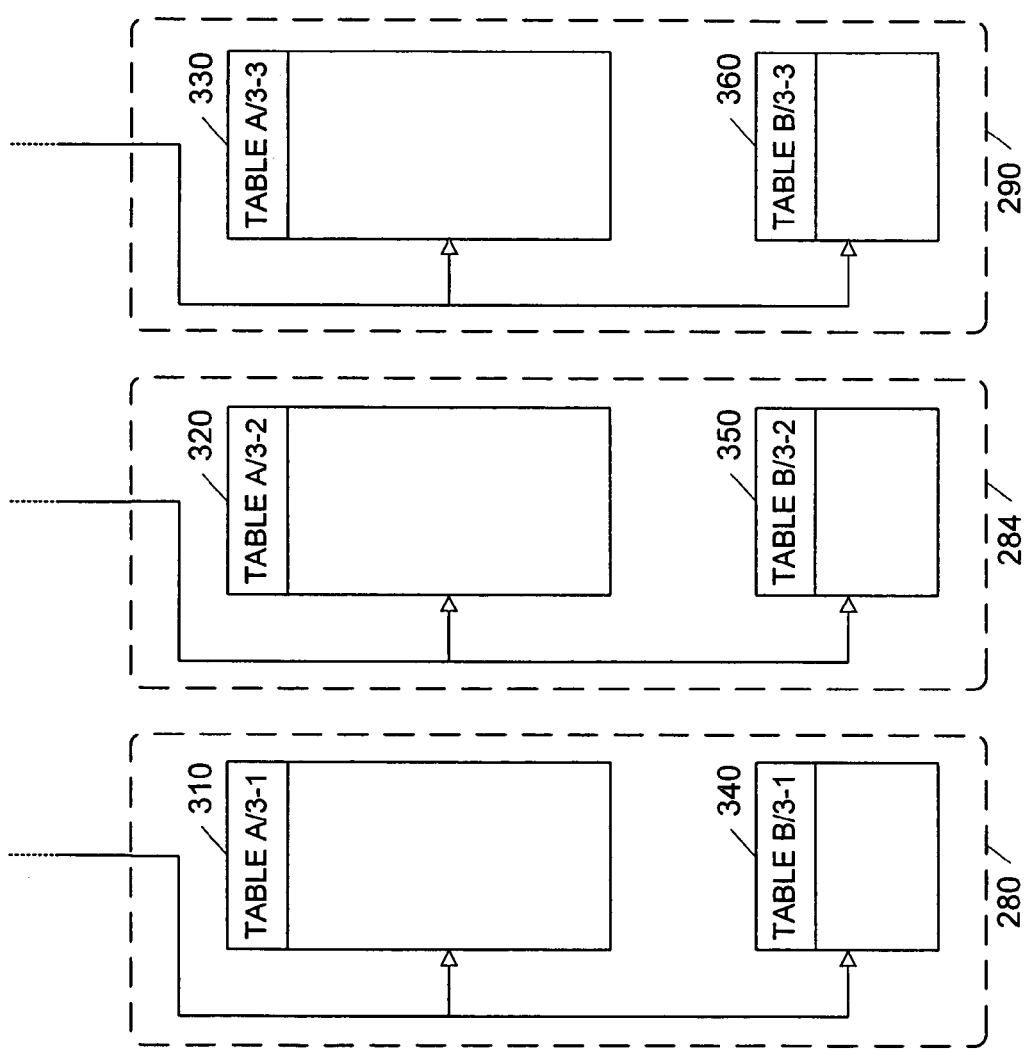
FIG. 3 is a block diagram illustrating an example of database table storage in the logical processor storage areas shown in FIG. 2.

FIG. 3 is a block diagram illustrating an example of database table storage in the storage areas 280, 284, 290 shown in FIG. 2. As described above, each node can store a portion of the database information, preferably an approximately equal portion as for the other nodes. Typically, a database refers to a collection of data tables. By storing the database tables in approximately equal portions among the available nodes, the processing load of performing query commands is spread among the nodes, allowing for significantly faster database retrieval. In this way, database retrieval speed is improved as the nodes 164, 170, 174, 180 process database query commands concurrently in a parallel fashion for the portion of the database table stored at each the respective nodes.

FIG. 3 represents a single node example with three of the logical processing units storing two tables. In this example, the LCPU2 240, LCPU3 250 and LCPU4 260 (see FIG. 2), and their associated memory storage areas, storage area 2 280, storage area 3 284 and storage area 4 290, respectively, store Table A and Table B. Each of the tables is stored in approximately equal portions at each of the storage areas 280, 284, 290. For example, approximately one-third of Table A is stored in each of the storage areas 280, 284, 290, and likewise for Table B. Thus, as shown in FIG. 3, a first portion of Table A, denominated TableA/3-1 310, is stored on the storage area 280. Similarly, a second portion of Table A, denominated TableA/3-2 320, is stored on the storage area 284. A third portion of Table A, denominated TableA/3-3 330, is stored on the storage area 290. Likewise, a first portion of Table B, denominated TableB/3-1 340, is stored on the storage area 280. A second portion of Table B, denominated TableB/3-2 350, is stored on the storage area 284. A third portion of Table B, denominated TableB/3-3 360, is stored in the storage area 290.

In an example having two nodes each with three logical processing units for a total of six logical processing units (not shown), each database table can be distributed among the storage areas associated with each Tstore in approximately equal one-sixth portions. Likewise, in a three-node example in which each node has three logical processing units for a total of nine logical processing units (not shown), each database table is distributed among the storage areas in approximately equal one-ninth portions. Thus, where N represents the total number of logical processing units, the database data and processing load is distributed in approximately equal 1/N portions. In other embodiments, the data is distributed in a non-uniform fashion in which the data are stored on the nodes or Tstores in unequal portions. For example, one table can be stored on a single Tstore, or one table can be stored on a group of Tstores. As additional examples, a group of related tables can be stored on a single Tstore, or a group of related tables can be stored on a group of Tstores. In addition, the data distribution can be a combination of uniform and non-uniform distribution. For example, certain tables can be distributed in one fashion, such as uniformly, while other tables in the same system can be distributed in another fashion, such as non-uniformly. In these embodiments, each Tstore stores some subset of the total database.

In the uniform distribution embodiments, one way of distributing the database tables in approximately equal portions, for example, is round robin distribution, in which successive database write operations are directed to the individual Tstores one at a time in circular succession. In some embodiments, database write commands that involve writing a new record to a database table are performed in a round robin manner. Round robin distribution refers to writing successive new records to a database table such that the records are written in approximately equal portions in a sequential and circular fashion.

For example, in a three-Tstore system, write commands could be sent to the Tstores according to round robin distribution in the following sequential order: Tstore 1, Tstore 2, Tstore 3, Tstore 1, Tstore 2, Tstore 3, etc. Of course, there are many other ways of distributing the records of the database tables to multiple Tstores or processing units in approximately equal amounts. In addition, although the number of nodes present in the distributed database system 160 and the number of Tstores present in each node can vary, in this example the distributed database system 160 distributes the database tables approximately equally over the total number of Tstores present.

Figure 4:
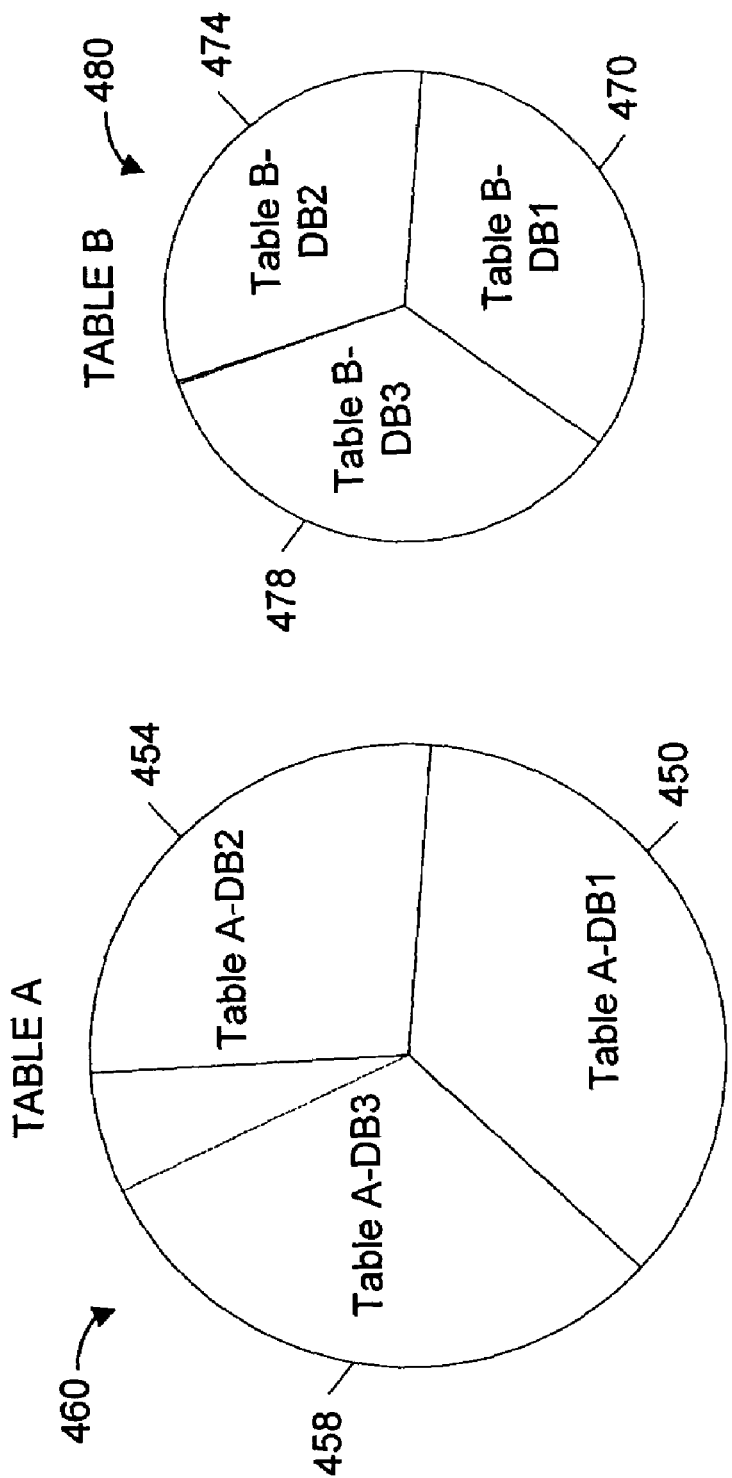
FIG. 4 is a diagram illustrating a representation of storage of two database tables in a single node embodiment of the distributed database system.

FIG. 4 is a diagram illustrating a representation of storage of two database tables in a single node embodiment of the distributed database system 160. Database tables can be visualized as having a row by column configuration. The columns of a database table represent the various categories of information that are capable of being stored for each record in the database table. Each row of a database table represents a record or an entry for which some or all of the column data can be stored. As a simple example, a database table can be configured to have three columns to store name, address and telephone number information for customers. Each row of the database table represents a list of the individual customers for which the name, address and telephone number information can be stored. In this example, if the user has 100 customers stored in the database, the corresponding database table would have 100 rows and three columns.

In the single node, multiple Tstore embodiment, since the rows or records of the database tables are stored on multiple Tstores, the distributed database system 160 cannot search for all matching records in the database tables in a single step. One of the more interesting types of searches involves the intersection of two tables in which database records are stored. The process of searching and comparing multiple tables for matching records in the single node embodiment is described below with regard to FIGS. 5A, 5B and 5C. First, an overall, top-level description of the database table storage is provided.

As shown in FIG. 4, in the single node embodiment having three Tstores, a database table, designated as Table A 460, is stored in approximately equal portions at each of the three Tstores. The approximately one-third portions (in this example, 1/N, where N=3) are designated in FIG. 4 as TableA-DB1 450, TableA-DB2 454, and TableA-DB3 458. The Table A 460 is shown as a pie-shaped object to illustrate that the three portions of the Table A 460, while stored separately at each of the Tstores, make up the entire database table when taken together as a whole. Similarly, a second database table, designated as Table B 480 in FIG. 4, is also stored in approximately equal one-third portions labeled TableB-DB1 470, TableB-DB2 474, and TableB-DB3 478.

In multi-node embodiments, or embodiments in which each node has more or fewer than three Tstores present, each database table is divided into a number of portions that represents the total number (N) of the Tstores present in all the nodes of the distributed database system 160. For example, if the distributed database system 160 has two nodes each with three Tstores, the records of the database tables would be distributed as approximately equal one-sixth portions. Likewise, if the distributed database system 160 has three nodes each with four Tstores, the records of the database tables would be distributed as approximately equal one-twelfth portions.

Figure 5A:
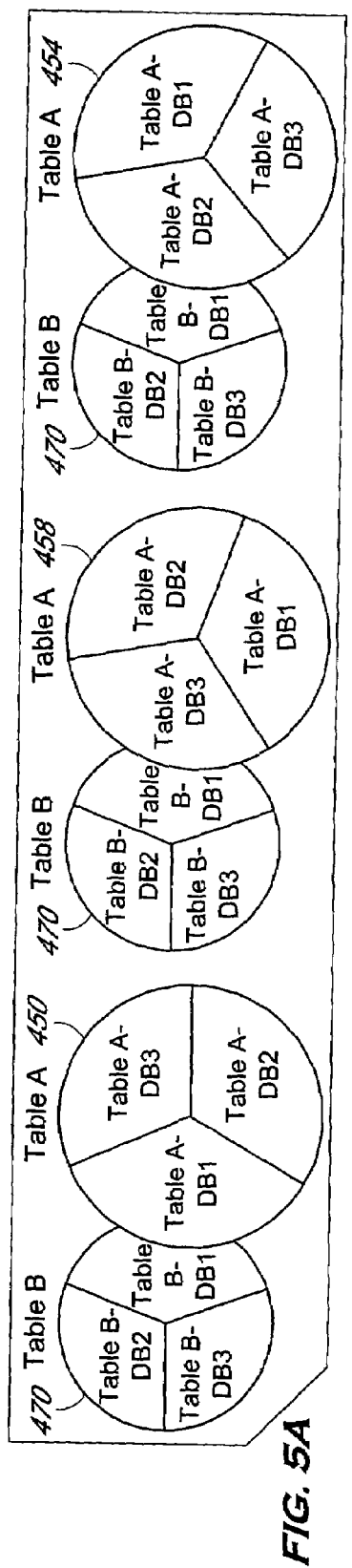
FIG. 5A is a diagram illustrating an example of one phase of a database query command in the single node embodiment of the distributed database system.
Figure 5B:
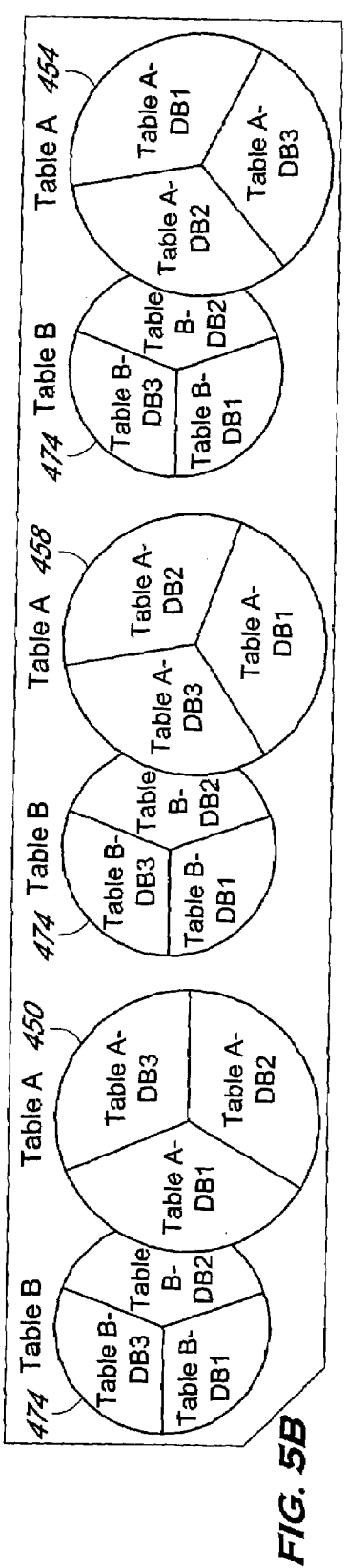
FIG. 5B is a diagram illustrating an example of an additional phase of a database query command in the single node embodiment of the distributed database system.
Figure 5C:
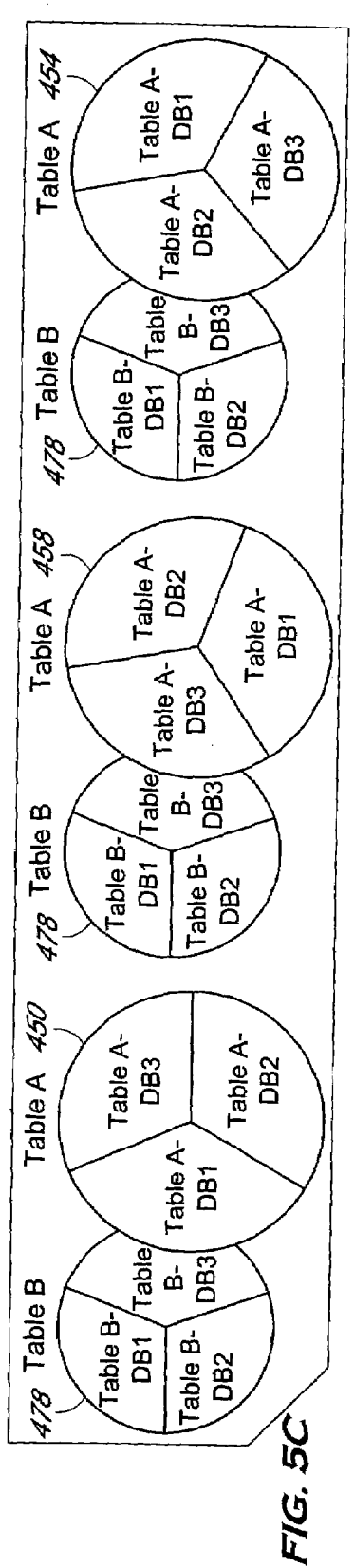
FIG. 5C is a diagram illustrating an example of an additional phase of a database query command in the single node embodiment of the distributed database system.

FIG. 5A is a diagram illustrating a representation of an example of one phase of a database query command in the single node embodiment of the distributed database system 160. In this two table example, the intersection of the tables, shown in FIG. 5A by the overlapping portion of the circles, represents the records in each of the tables that match the database query command. For example, such a database query command could be requesting a listing of all new customers (stored in the new customer Table A) who made purchases in the month of July (all July purchase records are stored in Table B). Therefore, the overlap or intersection of Tables A and B in FIG. 5A represents new customers who made purchases in July. To compile a table of records matching the search criteria, referred to as a results file, each of the three portions of the Table B 480 is compared in conjunction with each of the three portions of Table A 460. FIG. 5A shows one phase of the three-phase search, while FIGS. 5B and 5C show the two additional phases.

The queries can be conducted on the entire portion of each of the database tables, or a subset thereof having one or more fields or columns removed. For example, if the database query involves searching for customers having a certain name, the database tables that are searched and compared can be a single column subset of the full column table with the other fields removed and only the name field included. The database tables that are actually compared, whether the full tables or a subset thereof, are referred to as join tables. Therefore, the Table A 460 and the Table B 480 can represent join tables that are smaller than the full database tables in that one or more columns can be removed in producing the corresponding join tables. Pairing down the join tables to include only the data items necessary to perform the particular query command improves the performance of the distributed database system 160 by requiring less data to be transferred between the nodes and Tstores, as will become apparent as the query operation is described below. A database query can involve the generation and processing of multiple join tables. However, the following examples describe the case in which the database query involves a single join table.

As shown in FIG. 5A, the portion TableB-DB1 470 of the Table B 480 is compared with each of the three portions of Table A to determine the records that are in all these portions matching the search criteria. The database table portion TableB-DB1 470 and the portion TableA-DB1 450, both stored at the same Tstore, are compared for records present in both portions that match the search criteria. The portion TableB-DB1 470, stored at one Tstore, and the portion TableA-DB3 458, stored at another Tstore, are compared for records present in both portions that match the search criteria. The portion TableB-DB1 470 and the portion TableA-DB2 454, stored at another Tstore, are compared for records present in both portions that match the search criteria.

In this way, an intermediate results file compiled from the phase of the query in FIG. 5A includes records in the TableB-DB1 470 portion of the Table B 480 and the entire Table A 460 that match the search criteria. This intermediate results file is saved for combining with the other intermediate results files from the phases of FIGS. 5B and 5C to produce a single final results file having the records matching the query command for the whole database.

FIG. 5B is a diagram illustrating a representation of a second phase of a database query command in the single node embodiment of the distributed database system 160. The portion TableB-DB2 474 of the Table B 480 is compared in combination with each of the three portions of the Table A 460 to determine the records that are in all these portions that match the search criteria. The database table portion TableB-DB2 474, stored at one Tstore, and the portion TableA-DB1 450, stored at another Tstore, are compared for records present in both portions that match the search criteria. The portion TableB-DB2 474 and the portion TableA-DB3 458, stored at another Tstore, are compared for records present in both portions that match the search criteria. The portion TableB-DB2 474 and the portion TableA-DB2 454, both stored at the same Tstore, are compared for records present in both portions that match the search criteria.

In this way, the intermediate results file compiled from the phase of the query in FIG. 5B includes records in the TableB-DB2 474 portion of the Table B 480 and the entire Table A 460 that match the search criteria. This intermediate results file is saved for combining with the other intermediate results files from the phases of FIGS. 5A and 5C to produce the final results file.

FIG. 5C is a diagram illustrating a representation of a third phase of a database query command in the single node embodiment of the distributed database system 160. The portion TableB-DB3 478 of Table B 480 is compared in combination with each of the three portions of Table A to determine the records that are in all these portions that match the search criteria. The database table portion TableB-DB3 478, stored at one Tstore, and the portion TableA-DB1 450, stored at another Tstore, are compared for records present in both portions that match the search criteria. The portion TableB-DB3 478 and the portion TableA-DB3 458, both stored at the same Tstore, are compared for records present in both portions matching the search criteria. The portion TableB-DB3 478, stored at one Tstore, and the portion TableA-DB2 454, stored at another Tstore, are compared for records present in both portions that match the search criteria.

In this way, the intermediate results file compiled from the phase of the query in FIG. 5C includes records in the TableB-DB3 478 portion of the Table B 480 and the entire Table A 460 matching the search criteria. This intermediate results file is saved for combining with the other intermediate results files from the phases of FIGS. 5A and 5B to produce the final results file. Once the three intermediate results files are produced as described in the example above, they can be combined into a final results file that includes those records that are present in all the portions of both Table A 460 and Table B 480 that match the search criteria. The combining of intermediate results files to build the final results file is referred to as gather processing. The distributed database system 160 returns the final results table to the requestor, for example, the database server 130 or directly to the user at the client computer system 110.

While the query shown in FIGS. 5A, 5B and 5C are for a single node system, queries for multinode systems can be performed in a similar fashion. In multinode queries, the database tables can be divided into a number of portions equal to the total number of Tstores present in the nodes of the distributed database system 160. For example, for a two-node system having three Tstores per node, the database tables are divided into one-sixth (⅙) portions. In multinode embodiments, each of the join tables is sent to each of the other nodes for comparing by each of the remote Tstores with local join tables.

In addition, FIGS. 5A, 5B and 5C show query commands for single node systems with three Tstores per node, but more or fewer Tstores can be present on each node. Still further, FIGS. 5A, 5B and 5C show comparing of two database tables. However, more than two tables can be compared in performing a query command. Regardless of the number of database tables involved in the query, the number of nodes present, or the number of Tstores on each node, the query command processing can be performed in a manner analogous to that shown in FIGS. 5A, 5B and 5C.

Figure 6:
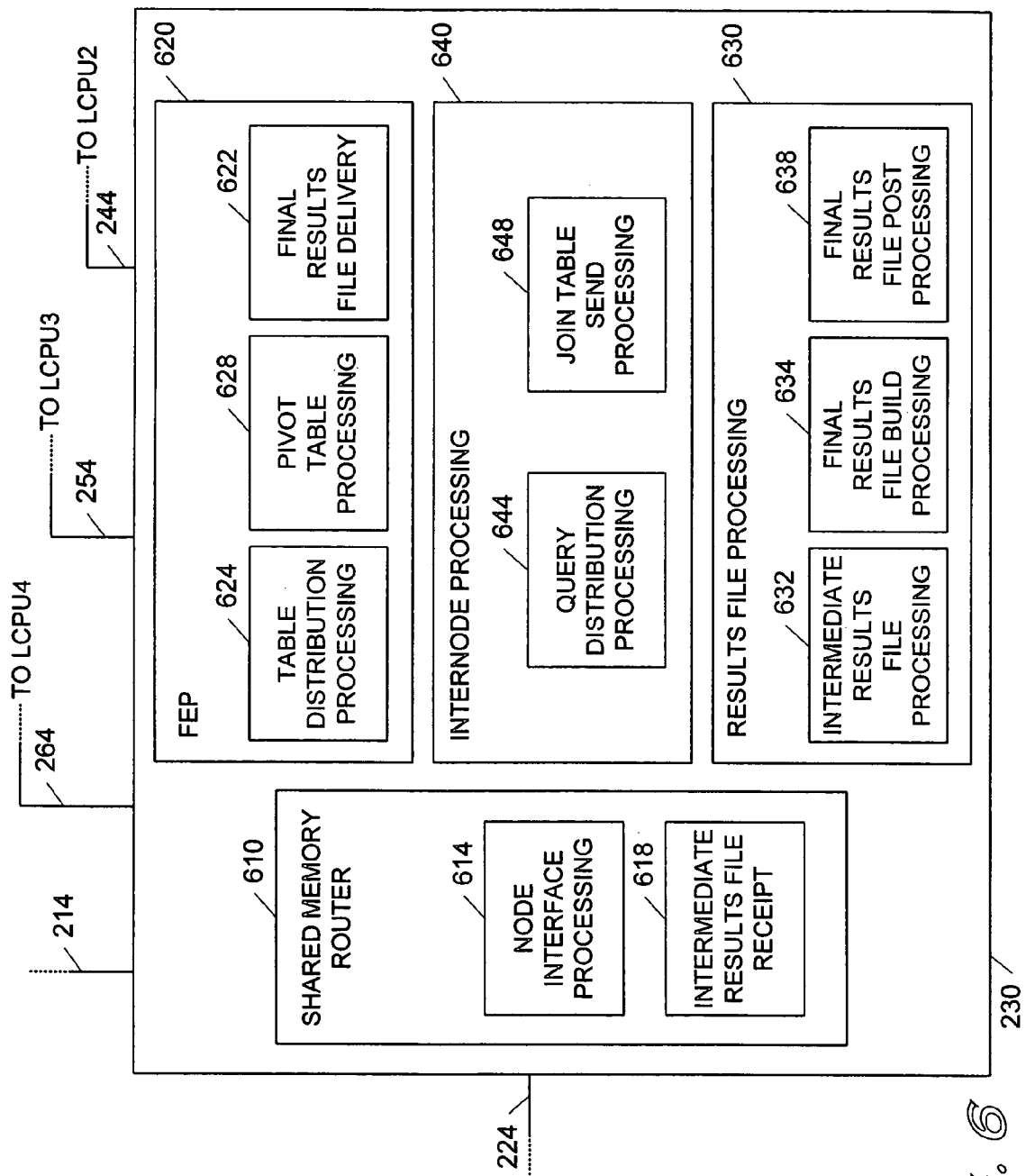
FIG. 6 is a block diagram illustrating components or modules of the controller of the primary node shown in FIG. 2.

FIG. 6 is a block diagram illustrating components or modules of the LCPU1 230 of the primary node 164 shown in FIG. 2. The LCPU1 230 of the primary node 164, also referred to as the primary controller 230, performs management and data transfer functions for the distributed database system 160 associated with executing the database write and query commands and returning the query results. These functions can include, but are not limited to, transmitting and receiving database commands and associated data from the DB server 130, distributing database commands (including a join table definition specifying how to build the join tables) to the nodes 164, 170, 174, 180 in the distributed database system 160, receiving intermediate results files from the nodes 164, 170, 174, 180, building the final results file, and optionally performing post-processing operations on the results files.

The primary controller 230 includes a shared memory router module 610. The shared memory router module 610 operates to propagate data more efficiently among the nodes 164, 170, 174, 180 and the LCPU1 230, LCPU2 240, LCPU3 250 and LCPU4 260 by reducing unnecessary or redundant copying of data. One example of redundant data copying that can be eliminated by the shared memory router 610 involves join tables that a Tstore sends to the other Tstores. For example, in the case where each node has three Tstores, the shared memory router 610 only sends one copy of the join table to each node, rather than three copies to each node for each of the three Tstores. The shared memory router at the receiving node makes the single copy of the join table available to all the Tstores on the node. The shared memory router 610 can also be used more generally to efficiently distribute data, jobs, or tasks among multiple processors in a clustered environment. The operation of the shared memory router 610 is described in greater detail below, for example, with regard to FIG. 13.

In some embodiments, the Tstores have an inbound queue, or an outbound queue, or both. The shared memory router 610 can place input data (or a pointer to the data) for the Tstore in the Tstore's inbound queue for processing by the Tstore. In addition, the shared memory router 610 can send the Tstore's output data (or a pointer to the data) in the Tstore's outbound queue to other nodes or other Tstores.

If the destination of a message is a remote Tstore, the shared memory router 610 sends a message with the data to the shared memory router at the node of the destination Tstore. Once the has been received at the destination node, the shared memory router of the destination node updates the memory pointer in the message to point to the local memory location, then queues up a message to the destination Tstore with the updated memory pointer. In addition to the reduction of sending and copying the same data multiple times, a further advantage of the shared memory router 610 is that the sender of messages does not need to worry about the location of the destination Tstore. The shared memory router 610 determines the location of the destination of the messages, thus abstracting the communication of message to a simple datagram interface. For example, the sender tells the shared memory router 610 to send a data message to a particular Tstore without knowing the Tstore's actual location.

In some embodiments, the sender of the message indicates to the shared memory router 610 whether the message is to be a broadcast message sent to all nodes or Tstores in the distributed database system 160, or a point-to-point message that is sent only to a particular destination or to multiple particular destinations. For example, the sender can indicate whether to broadcast the message or send it to a particular destination based on data included in the message to the shared memory router 610. Alternatively, the shared memory router 610 can determine whether to send the message as a broadcast message or a point-to-point message, for example, based on the type of message being sent.

The shared memory router 610 includes a node interface processing module 614. The node interface processing module 614 communicates with the communication link interface module 210 (see FIG. 2) for transferring data between the primary node 164 and one or more of the secondary nodes 170, 174, 180. Examples of this inter-nodal data, which are described below, include join table definitions, the actual join tables themselves, and the intermediate results files. The node interface processing module 614 acts as an interface between the communication link interface module 210 and the modules of the primary controller 230. In some embodiments of the primary controller 230, the node interface processing module 614 acts as the interface between the communication link interface module 210 and various modules of the primary controller 230 via the communication link 224 as shown in FIG. 6.

The shared memory router 610 also includes an intermediate results file receipt module 618 for receiving the intermediate results files from each of the secondary nodes 170, 174, 180 for each Tstore and from the Tstores on the primary node 164. The intermediate results files receipt module 618 stores the intermediate results files for subsequent processing as described herein. In some embodiments, the commands and associated data sent from the primary controller 230 to the other nodes and the responses received from the other nodes by the primary controller 230 via the inter-nodal link 190 can be low-level, non-standard commands. In other embodiments, the commands and associated data sent from the primary controller 230 to the other nodes and the responses received from the other nodes by the primary controller 230 via the inter-nodal link 190 can be standard SQL commands. Therefore, each Tstore includes a database command processing module 820 (see FIG. 8) to parse SQL commands. These latter embodiments utilizing standard SQL commands are sometimes referred to as loosely-coupled architectures. In one example of a loosely-coupled architecture, all of the Tstores are configured to follow a particular communication protocol or job description language. Each Tstore, however, can have different hardware or software than one or more of the other Tstores, so long as each Tstore supports the same communication protocol or job description language.

The primary controller 230 additionally includes a front end processor (FEP) 620. The FEP 620 of the primary controller 230, also referred to as the primary FEP 620, performs processing of incoming data for the primary node 164, determines the pivot table, builds the final results file having the matching records for the database query command, and optionally performs post processing operations on the intermediate or final results files.

The primary FEP 620 includes a table distribution processing module 624, which receives database write commands from the database server interface processing module 220 (see FIG. 2) via the communication link 214. For example, the database write commands can include commands to add new records to a database table or update data in an existing database table record. For new records, the table distribution processing module 624 additionally determines the particular node and/or Tstore to which the record is to be stored. In some embodiments, the table distribution processing module 624 determines the particular node that is to store the updated data and the particular node determines which Tstore on that node is to store the new record. Alternatively, the table distribution processing module 624 can determine the individual Tstore on a particular node that is to store the new record. The table distribution processing module 624 additionally transmits the identification of the target node and/or Tstore to the node interface processing module 614 for transmittal to the target node or Tstore.

With regard to commands to write new records to a database table, one way the table distribution processing module 624 can determine the node and/or Tstore to store the new record is to distribute the records on an approximately equal basis by a round robin distribution process. The round robin processing of the table distribution processing module 624 is further described below, for example, with regard to FIG. 10. Alternatively, for updated records, the table distribution processing module 624 transmits a broadcast message via the node interface processing module 614. A broadcast message is a message that is sent once and is able to be received by all the nodes that are present in the distributed database system 160. By sending a broadcast message, the node on which the record to be updated is stored receives the data and the corresponding Tstore updates the record accordingly. The other nodes that do not include the Tstore that is storing the updated record simply ignore the broadcast message.

The primary FEP 620 additionally includes a pivot table processing module 628 for receiving a database query command and determining the database table to be the pivot table for the query. When a query command involving multiple database tables is performed, one of the join tables does not need to be sent to the other Tstores for query processing. In the two-table example, only one of Table A 460 or Table B 480 is sent to the other Tstores for comparing by each of the Tstores. The table that is not sent to the other Tstores is referred to as the pivot table. In a three-table example, only two tables are sent to the other Tstores. In some embodiments, to increase performance of the query processing, the pivot table processing module 628 determines that the smaller of the database tables are sent to the other Tstores, and the largest table is the one that is not sent (the pivot table). However, in other embodiments, different parameters besides performance can be the determining factors, such that another table besides the largest can be selected as the pivot table. In some embodiments, the pivot table processing module 628 can select the pivot table by maintaining and using tables that indicate, for example, where each database table is stored, the size of each table, and the row/column configuration of each table. In some embodiments, the pivot table processing module 628 can identify the pivot table to the Tstores in the format of one or more SQL commands. One way to implement these embodiments is for the pivot table processing module 628 to send SQL query commands to the Tstores telling them which tables to compare. By telling the Tstores to compare the same table to other tables, that same table becomes the pivot table.

The primary FEP 620 further includes a final results file delivery module 622. The final results file delivery module 622 sends the final results file of the database query command to the requester, for example, the DB server 130 or alternatively directly to the user at the client computer system 110. The final results file is the single file that represents the final results of the query command based on the current contents of the applicable database table. The building of the final results file, which is referred to as gather processing, is described below.

The primary controller 230 additionally includes an internode processing module 640 for processing and transferring data received by or produced on the primary node 164 to other Tstores and other nodes. The internode processing module 640 includes a query distribution processing module 644 for sending the query command to the secondary nodes 170, 174, 180 and to the Tstores of the primary node 164. The query command from the primary node 164 to the secondary nodes 170, 174, 180 can be a SQL query command, as is the query command from the DB server 130 to the primary node 164. Alternatively, the query command sent to the secondary nodes 170, 174, 180 can be in a non-SQL format, such as a proprietary query format. To distinguish between the potentially different query command formats, the query command to the primary node 164 is referred to as a primary query command or a primary query. In addition, the query command to the secondary nodes 170, 174, 180 is referred to as a secondary query command or a secondary query. In other embodiments, the primary query and the secondary query can be jobs, tasks or operations, often including associated data, for distributed processing.

One example of different primary and secondary queries is when a part or the whole primary query cannot be accomplished in a distributed manner. For example, if the primary query is to select the value that occurs most frequently in a particular field of a database table, each Tstore in a distributed system can only calculate the most frequently occurring value from the tables stored locally on that Tstore. In this example, the secondary query is to return all values for the field to the primary node. The primary node calculates the most frequently occurring value for the field of the distributed table. In other embodiments, the secondary query can be of the same format as the primary query, or the secondary query can be identical to the primary query. References herein to the query command without indicating whether the primary or secondary query refers to the primary query.

The query distribution processing module 644 determines how each Tstore is to build the join table that is compared for records matching the search criteria. In some embodiments, the query distribution processing module 644 can determine how each Tstore is to build the join table by maintaining internal tables that indicate, for example, where each database table is stored, the size of each table, and the row/column configuration of each table. The query distribution processing module 644 sends to the secondary nodes 170, 174, 180 the join table definition, which includes information on how to build the join table, via the node interface processing module 614. In addition, the query distribution processing module 644 sends to the secondary nodes 170, 174, 180 the identification of the table that is designated as the pivot table for the query command as determined by the pivot table processing module 628.

The internode processing module 640 also includes a join table send processing module 648 for sending the join tables built by the Tstores to other Tstores. In some embodiments, the join tables are sent via the node interface processing module 614 of the shared memory router 610, over the communication link 224 to the other nodes for performing the query command.

The primary controller 230 additionally includes a results file processing module 630 for building the final results files for the query command from the intermediate results files generated by the Tstores. The results file processing module 630 includes an intermediate results file processing module 632 for accessing the intermediate results files stored by the intermediate results files receipt module 618 as described above. The results file processing module 630 additionally includes a final results file build processing module 634 for processing the intermediate results files and building the single, final results file that represents the final results of the query command based on the current contents of the applicable database tables. Building the final results file from the multiple intermediate results files is referred to as gather processing.

The intermediate or final results files can optionally be examined by a final results file post-processing module 638 of the primary FEP 620 to perform post-processing operations or analysis of the results files. Post-processing can involve operations on, or analysis of, the results files. For example, the query command can require that only unique instances of the records satisfying the query be returned. The individual Tstores are not able to perform this function as each Tstore only has access to its own intermediate results file, not the intermediate results files of other Tstores. Thus, in this example, the final results file post-processing module 638 scans the final results file produced by the final results file delivery module 622 and removes any duplicate entries that may exist. The final results file, either after post-processing or without any post processing, is sent to the requester, for example, the DB server 130 or alternatively directly to the user at the client computer system 1 10.

Figure 7:
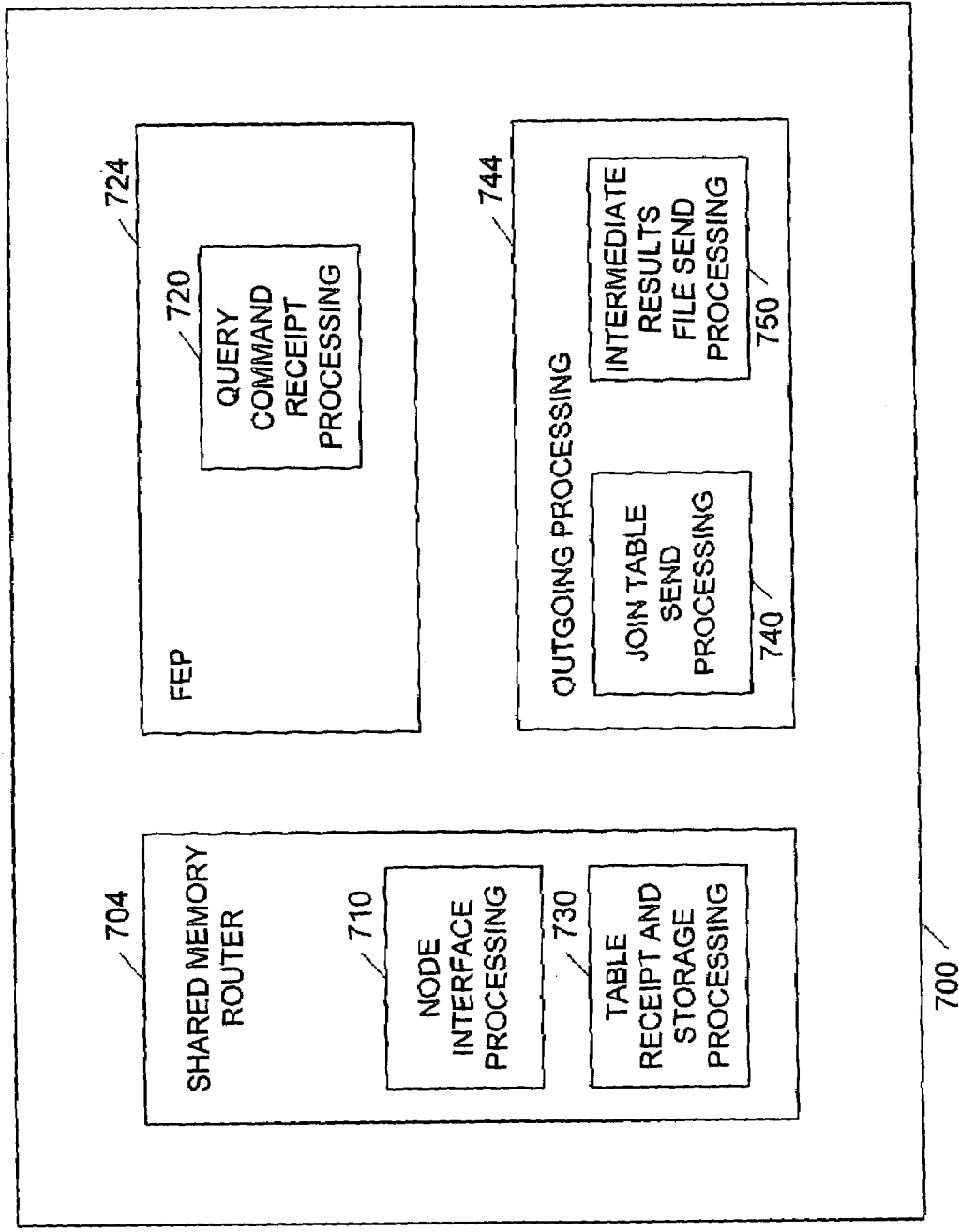
FIG. 7 is a block diagram illustrating components or modules of the controller of the secondary nodes shown in FIG. 2.

FIG. 7 is a block diagram illustrating components or modules of an example controller 700 of the secondary nodes 170, 174, 180 shown in FIG. 2. The controller 700 is analogous to the primary controller 230 shown in FIG. 2, but for the secondary nodes 170, 174, 180. The controller 700, also referred to as the secondary controller 700, performs management and data transfer functions for the secondary nodes 170, 174, 180 associated with executing the database write and query commands and returning the query results. These management functions can include, but are not limited to, receiving database commands and associated data from the primary controller 230, sending join tables to other Tstores, and sending intermediate results files from each Tstore on the secondary nodes 170, 174, 180 to the primary controller 230.

The secondary controller 700 includes a shared memory router 704. The shared memory router of the secondary controller 700 operates to propagate data more efficiently among the nodes 164, 170, 174, 180 and the LCPU1 230, LCPU2 240, LCPU3 250 and LCPU4 260 by reducing unnecessary or redundant copying of data. In some embodiments, the shared memory router 704 of the secondary nodes and the shared memory router 610 of the primary node can be interchangeable components that are configured to perform different, additional or fewer functions depending on whether executing on a secondary node or the primary node. The shared memory router 704 includes a node interface processing module 710. The node interface processing module 710 communicates with the communication link interface module 210 (see FIG. 2) for transferring data between the secondary nodes 170, 174, 180 and the primary node 164. Examples of this inter-nodal data include the database write and query commands, the join tables, and the intermediate results files. The node interface processing module 710 acts as an interface between the communication link interface module 210 and the modules of the secondary controller 700.

The shared memory router 704 additionally includes a table receipt and storage processing module 730 for receiving database write commands to update existing records and add new records to database tables. The table receipt and storage processing module 730 additionally stores the updated data to the appropriate location in memory for the affected database table.

The secondary controller 700 also includes a front end processor 724, also referred to as the secondary FEP 724. In some embodiments, the secondary FEP 724 and the primary FEP 620 can be interchangeable components that are configured to perform different, additional or fewer functions depending on whether executing on a secondary node or the primary node. The secondary FEP 724 includes a query command receipt processing module 720 for receiving query commands and associated join table definition data from the primary controller 230. The query command receipt processing module 720 makes available the join table definition data for access by the Tstores in building the join tables.

The secondary controller 700 also includes an outgoing processing module 744 for processing and transferring data produced on the local node to other Tstores or nodes. In some embodiments, the outgoing processing module 744 on the secondary node and the internode processing module 640 on the primary node can be interchangeable components that are configured to perform different, additional or fewer functions depending on whether executing on the secondary node or the primary node. The outgoing processing module 744 includes a join table send processing module 740 for sending the join tables built by the Tstores. The join tables are sent to the other Tstores for performing the query command as described above.

The outgoing processing module 744 further includes an intermediate results file send processing module 750. The intermediate results files send processing module 750 reads results file data from memory for each of the local Tstores of the secondary node and sends them to the primary node 164 for gather processing into the final results file. Alternatively, the gather processing of the intermediate results files of the local Tstores can be performed by each of the secondary controllers 700 instead of by the primary controller 230. In such embodiments, each node sends a single intermediate results file for that node, rather than sending intermediate results files for each Tstore. The primary controller 230 in this example performs gather processing on each node's results file to produce the final results file.

Figure 8:
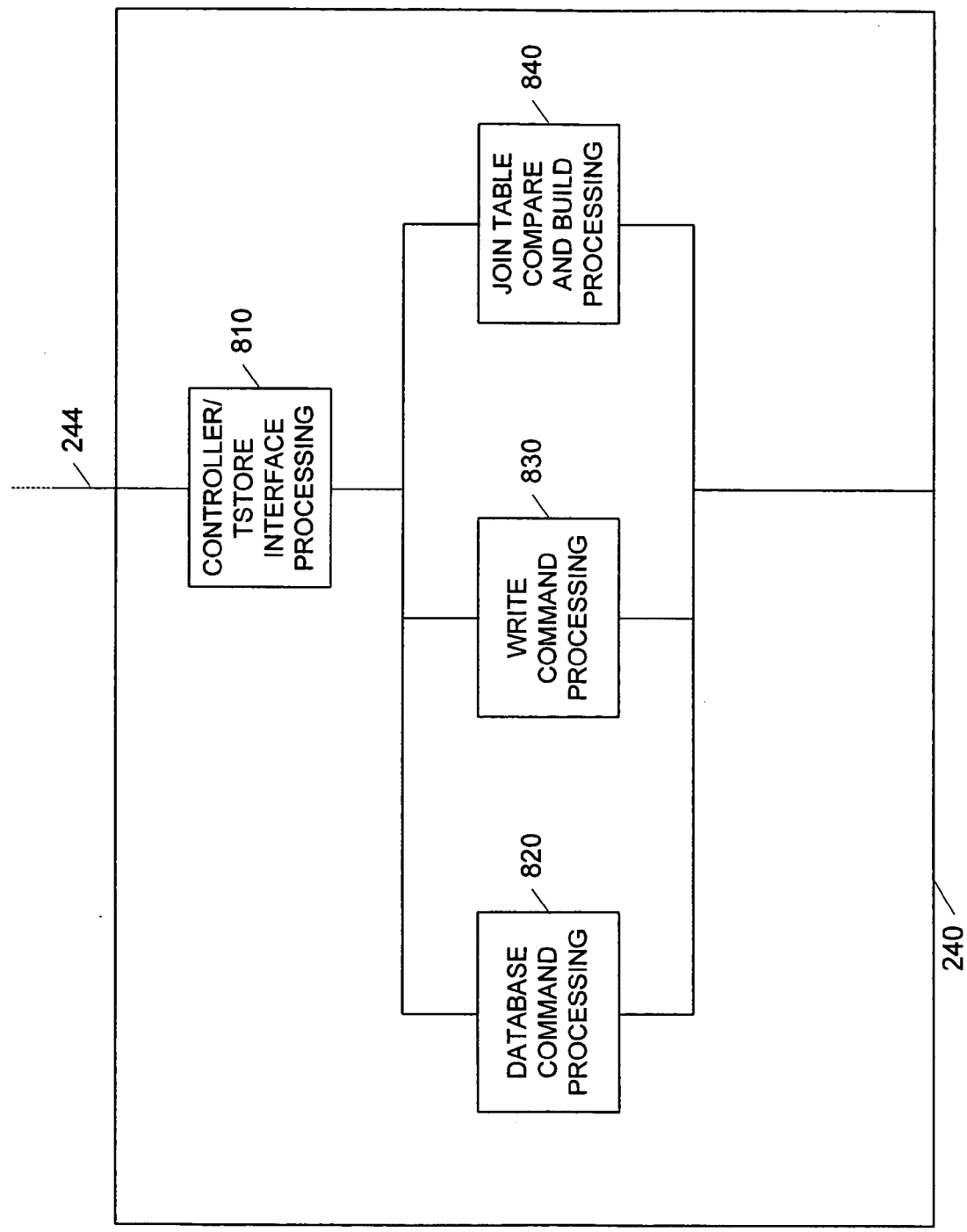
FIG. 8 is a block diagram illustrating components or modules of the logical processors of the nodes shown in FIG. 2.

FIG. 8 is a block diagram illustrating components or modules of the logical processors LCPU2 240, LCPU3 250, and LCPU4 260 of the node 164 shown in FIG. 2. In certain embodiments of the distributed database system 160, the Tstores executing on the logical processors perform the actual join table comparing illustrated in FIGS. 5A, 5B, and 5C. For ease of illustration and description, the logical processor shown in FIG. 8 is labeled as the LCPU2 240. However, each of the LCPU2 240, the LCPU3 250, and the LCPU4 260 can operate in the same manner and can include the same components or modules.

The LCPU2 240 includes a controller/Tstore interface processing module 810 for communicating with the controller and with the other Tstores on the node. In embodiments of the primary controller 230 that utilize the shared memory router module 610, the controller/Tstore interface processing module 810 can be replaced with a SMR interface processing module (not shown) that handles the interface data between the Tstores and the shared memory router 610.

The LCPU2 240 additionally includes a database (DB) command processing module 820. Database commands include write commands, for example, to write a new record to a database table or update the data in an existing record, and query commands. In the case of database write commands, a write command processing module 830 receives the data to be written to the database, and writes the data to the appropriate database table in memory.

The LCPU2 240 includes a join table compare and build processing module 840 for processing database query commands. Upon receipt of a database query command, the join table compare and build processing module 840 builds join tables for use by the other local Tstores and for sending to the other nodes for use by the remote Tstores in carrying out the query command. In some embodiments, the primary FEP 620 determines how the join table compare and build processing module 840 is to build the join tables. For example, the primary FEP 620 can specify that certain columns of the database tables that are not involved in the query processing are to be removed in building the join tables. This results in increased efficiency and performance in performing the query command by not sending unused data in the database tables to the other Tstores in the join tables.

The join table compare and build processing module 840 also compares other Tstores' join tables to the portion of the pivot table that is stored in the Tstore in which the join table compare and build processing module 840 is executing. The join table compare and build processing module 840 compares its portion of the pivot table and the join tables of other Tstores for database table records that match the search criteria specified in the query command. The join table compare and build processing module 840 generates and sends the intermediate results file to the primary controller 230 for gather processing to build the final results file as described above.

Figure 9:
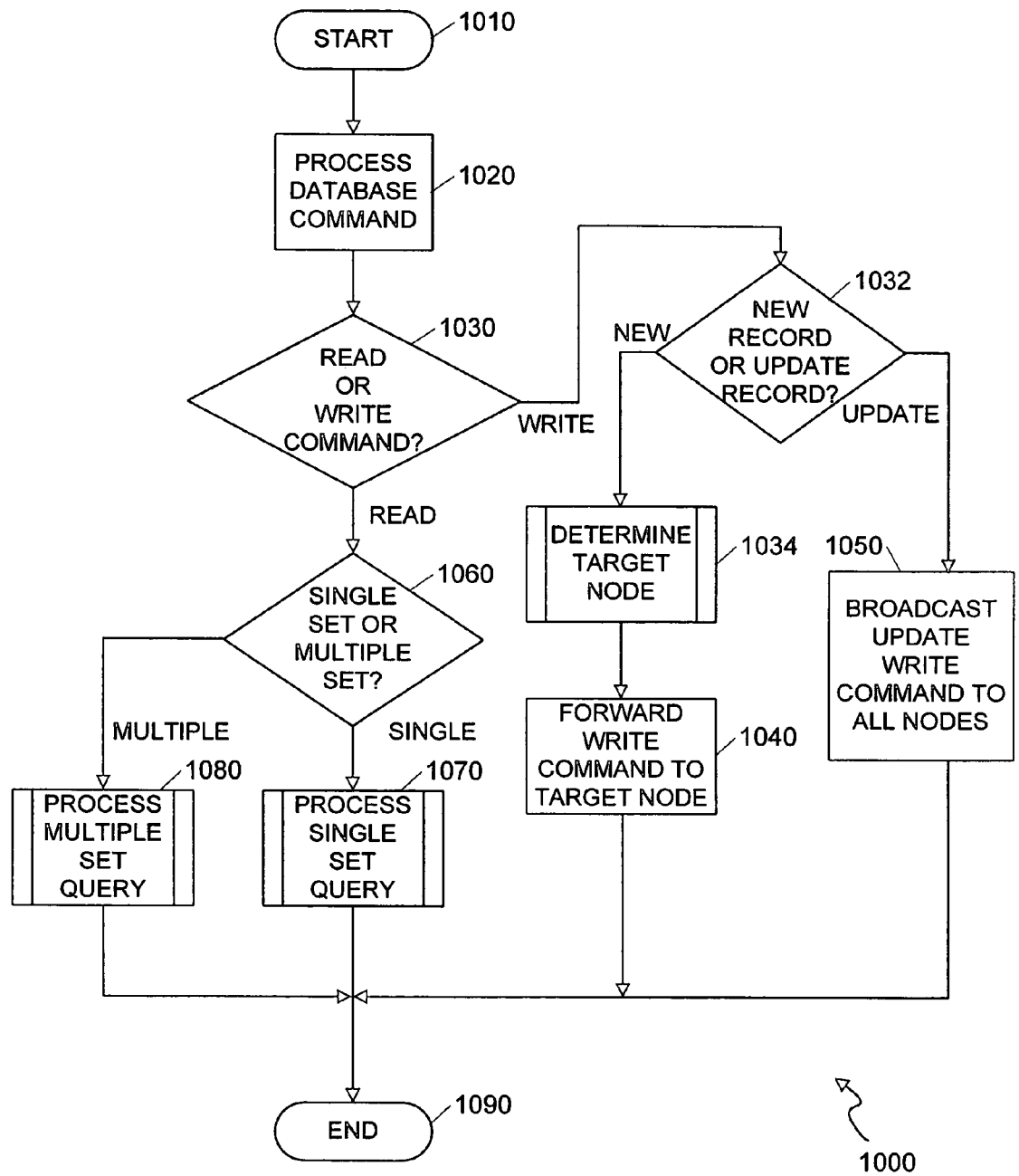
FIG. 9 is a flowchart illustrating a database command process as performed by the table distribution processing module shown in FIG. 6.

FIG. 9 is a flowchart illustrating a database command process 1000 which can be performed by the table distribution processing module 624 shown in FIG. 6. The database command process 1000 processes database commands, for example, read and write commands, and initiates the execution of the commands. The database command process 1000 begins at a start block 1010. The database command process 1000 continues to a block 1020 where the table distribution processing module 624 receives the incoming database commands and identifies the database command and the associated data. The database command process 1000 continues to a decision block 1030 where the table distribution processing module 624 determines whether the incoming database command is a read command or a write command, as the processing of the database commands varies based on the type of command.

If the table distribution processing module 624 determines at the decision block 1030 that the database command is a write command, the database command process 1000 continues to a decision block 1032 where the table distribution processing module 624 determines if the write command is to write a new record to the database table or update an existing record in the database table. If the table distribution processing module 624 determines at the decision block 1032 that the write command is to update an existing record, the table distribution processing module 624 continues to a block 1050 where the table distribution processing module 624 sends a broadcast command to all the nodes to update the existing record. Each node receives the broadcast command, but only the node on which the record to be updated is stored updates the record with the updated data.

If the table distribution processing module 624 determines at the decision block 1032 that the write command is to write a new record, the database command process 1000 continues to a block 1034 where the table distribution processing module 624 determines the target node for the write command. In some embodiments, the table distribution processing module 624 determines the target node by a round robin distribution. Round robin distribution refers to approximately equally distributing the write commands sequentially among the nodes until the last node is reached, at which point the next write command is sent to the first node and the process continues. A simple illustrative example involves a distributed database system with three nodes, in which write commands are sent to the nodes in the following order: Node 1, Node 2, Node 3, Node 1, Node 2, Node 3, Node 1, etc. The round robin process is described below with regard to FIG. 10. In other embodiments, the table distribution processing module 624 determines the target Tstore instead of the target node. In other words, the table distribution processing module 624 can determine the specific Tstore on each node to receive the write command, for example, on a round robin basis. In addition, the table distribution processing module 624 can determine the target node in any of a number of ways in which the new records are distributed to the nodes and Tstores in approximately equal portions.

The database command process 1000 continues to a block 1040 where the table distribution processing module 624 forwards the command to write a new record to the target node as determined by the block 1034. The table distribution processing module 624 forwards the write command by sending the command to the target node via the inter-nodal communication link 190. The target node stores the data associated with the new record in local memory on the target node for incorporation into the database table.

If the table distribution processing module 624 determines at the decision block 1030 that the database command is a read command such as a query, the database command process 1000 continues to a decision block 1060 where the table distribution processing module 624 determines whether the read command is for a single set query or a multiple set query. If the table distribution processing module 624 determines at the decision block 1060 that the read command is for a single set query, the database command process 1000 continues to a block 1070 where the table distribution processing module 624 processes the single set query. A single set query command is a query that involves accessing only a single database table to perform the query. For example, an example of a single set query is to return all occurrences of the last name "Jones" in a customer list database table. To perform such a query command, only a single database table, the customer list table, needs to be accessed and compared. The single set query processing of the block 1070 is described in greater detail below with regard to FIG. 11.

If the table distribution processing module 624 determines at the decision block 1060 that the read command is for a multiple set read, the database command process 1000 continues to a block 1080 where the table distribution processing module 624 processes the multiple set query command. A multiple set query command is a query that involves accessing multiple database tables to perform the query. One example of a multiple set query is to return all occurrences of the last name "Jones" in both a customer list database table and a delinquent account database table. To perform such a query command, multiple database tables, e.g., the customer list table and the delinquent account database table, are accessed and compared in order to return those records that are in both tables. The multiple set query processing of the block 1080 is described in greater detail below with regard to FIG. 12. The database command process 1000 terminates at an end block 1090.

Figure 10:
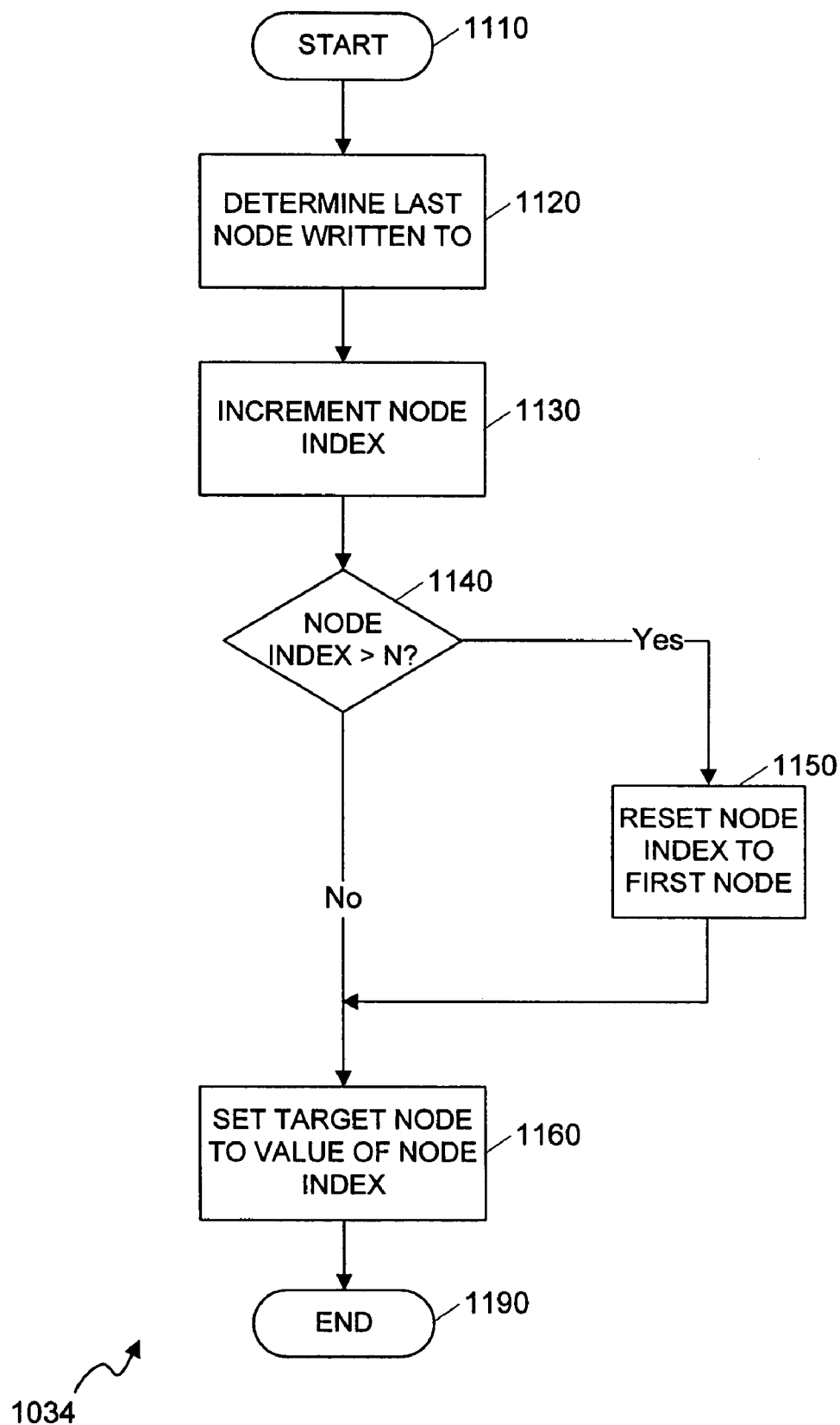
FIG. 10 is a flowchart illustrating a process of determining the target node for a database write command as performed by the primary FEP shown in FIG. 2.

FIG. 10 is a flowchart illustrating a process of determining the target node in the block 1034 of FIG. 9 as performed by the table distribution processing module 624 of the primary FEP 620 shown in FIG. 6. The target determination process 1034 shown in FIG. 10 is an embodiment of a round robin distribution process. Numerous other distribution processes can be implemented that result in approximately equal distribution of the database table records. The target determination process 1034 begins at a start block 1110. The target determination process 1034 continues to a block 1120 where it determines to which node the last new record of the database table was written. One way of determining the last node is to refer to the nodes by a unique index number, and storing the node index number in memory after each write of a new record to the database table. When a subsequent new record write command is received, this stored node index number becomes the last node written to. While the round robin distribution process described for FIG. 10 distributes write commands among nodes, other embodiments distribute write commands among Tstores.

The target determination process 1034 continues to a block 1130 where it increments the node index to indicate the node to receive the next new record being written to the particular database table. In round robin distribution, each successive new record is written to the next node in the sequence of nodes. The target determination process 1034 continues to a decision block 1140 where it determines whether the current node index is greater than the total number of nodes (represented by a maximum node number 'N') present in the distributed database system 160.

If the target determination process 1034 determines at the decision block 1140 that the current node index is greater than the maximum node number 'N', the target determination process 1034 continues to a block 1150 where it resets the node index to refer to the first node present in the distributed database system 160. For example, the index of the first node can be the number 1. If the target determination process 1034 determines at the decision block 1140 that the current node index is not greater than the maximum node number 'N', or after the block 1150, the target determination process 1034 continues to a block 1160 where it sets the target node index to the value of the current node index. The target node index indicates the next node to which the new record write command is written. The target determination process 1034 terminates at an end block 1190.

Figure 11:
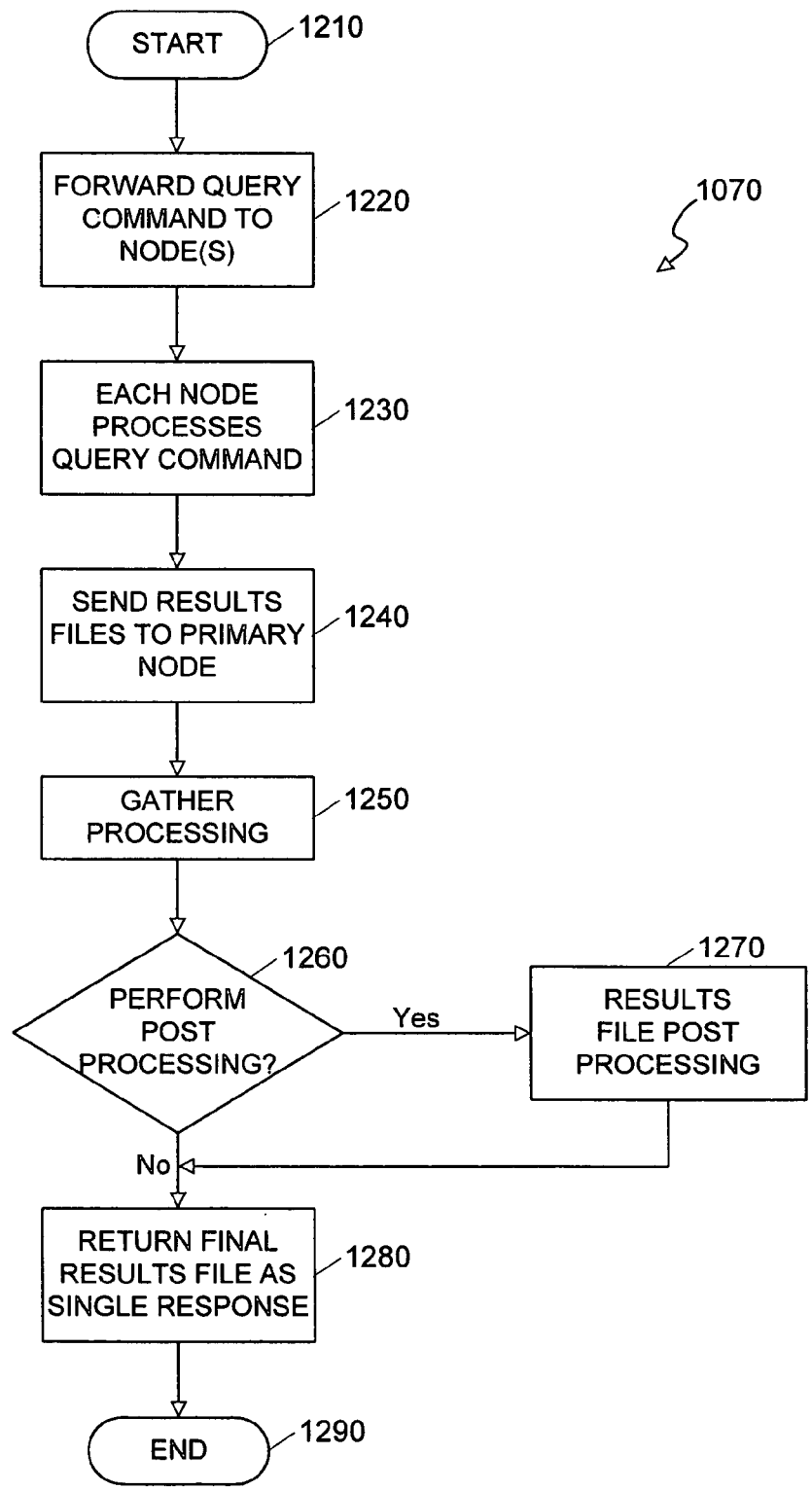
FIG. 11 is a flowchart illustrating a single set query process as performed by the distributed database system shown in FIG. 1.

FIG. 11 is a flowchart illustrating a single set query process 1070 as performed by the distributed database system 160 shown in FIG. 1. A single set query is a query command that involves accessing and comparing only a single database table to perform the query command. The single set query process 1070 begins at a start block 1210. The single set query process 1070 continues to a block 1220 where it forwards the secondary query command to the node or nodes for processing. As described above, the secondary query command corresponds to the primary query command received from the DB server 130, and can be the same as the primary query command, or it can be modified, for example, to conform to a different protocol than the primary query command. For example, the primary query command received from the DB server 130 can be a SQL command, and the secondary query command can be in a proprietary query command protocol. Alternatively, the primary query command received from the DB server 130 and the secondary query command can both be SQL commands. In some embodiments, the processing at the block 1220 is performed by the primary controller 230 (see FIG. 2). Alternatively, this can be performed by the shared memory controller 610, 704 as described above.

The single set query process 1070 continues to a block 1230 where it processes the query command as performed by each node present in the distributed database system 160.

In other embodiments, the processing of the query command at the block 1230 can be performed by each Tstore present at each node in the distributed database system 160. The query command processing at the block 1230 can include each Tstore at each node comparing the portion of the database table stored by the Tstore for records that match the search criteria specified in the query command. The query command processing at the block 1230 also can include each Tstore generating an intermediate results file that includes the matching records.

The single set query process 1070 continues to a block 1240 at which the nodes or Tstores send the intermediate results files generated at each node to the primary node 164 via the inter-nodal communication link 190. In some embodiments, the Tstores send the intermediate results files to the primary node via the shared memory router 610, 704. The single set query process 1070 continues to a block 1250 where it performs gather processing, such as by the primary LCPU1 230. As described above, gather processing involves building a single results file, referred to as the final results file, by combining the multiple intermediate results files received from each of the nodes as generated by each of the Tstores. The final results file includes the matching records that are identified in the multiple intermediate results files that are generated and sent by each of the nodes or Tstores.

The single set query process 1070 continues to a decision block 1260 where it determines whether to perform post-processing operations on the final results file. While FIG. 11 shows the post-processing operations being performed on the final results file, post-processing can also be performed on the intermediate results files prior to the gather processing. Post-processing operations can include such processing as removing certain duplicative records from the results files so that all matching records are unique. If the single set query process 1070 determines at the decision block 1260 that post processing is to be performed, the single set query process 1070 continues to a block 1270 where it performs the post-processing operations. After the block 1270, or if the decision block 1260 determines that post processing is not to be performed, the single set query process 1070 continues to a block 1280 where it returns the final results file to the requestor as a single response file. The single set query process 1070 terminates at an end block 1290.

Figure 12:
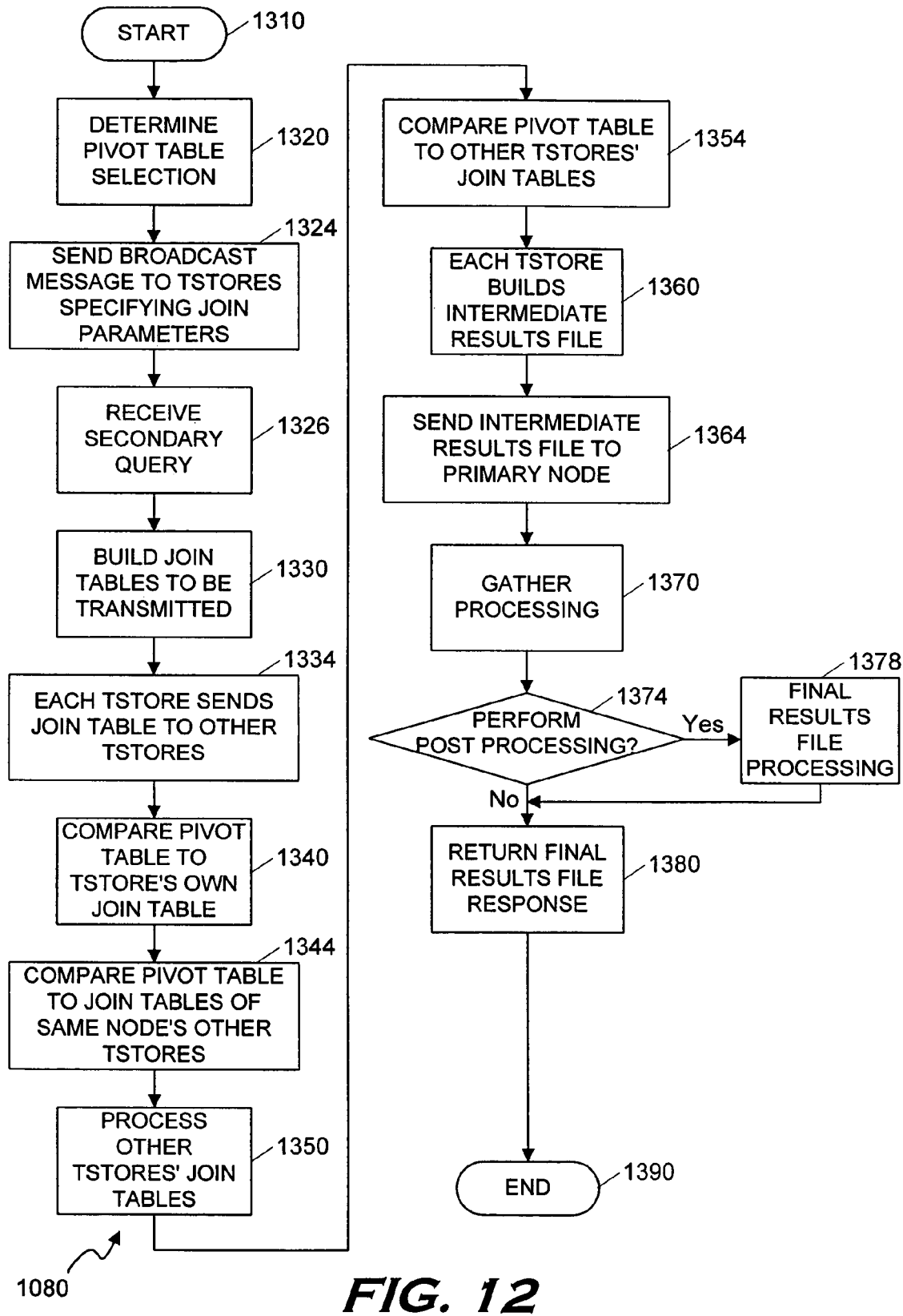
FIG. 12 is a flowchart illustrating a multiple set query process as performed by the distributed database system shown in FIG. 1.

FIG. 12 is a flowchart illustrating a multiple set query process 1080 as performed by the distributed database system 160 shown in FIG. 1. A multiple set query is a query command that involves accessing and comparing two or more database tables to perform the query command. The multiple set query process 1080 begins at a start block 1310. Continuing at a block 1320, the pivot table processing module 628 of the primary FEP 620 determines the pivot table. As described above, the primary FEP 620 can select the pivot table by maintaining internal tables that indicate, for example, where each database table is stored, the size of each table, and the row/column configuration of each table. In some embodiments, the pivot table in multiple set queries is the database table that is kept local on each node, in contrast to the join tables which are sent to the other nodes for performing the query command. The pivot table can be the database table to be compared that is the largest in size. By selecting the largest sized table as the database table to be kept local, the overall performance of the distributed database system 160 is increased by reducing the amount of data transferred over the inter-nodal communication link 190.

Continuing at a block 1324, the primary controller 230 sends a broadcast message to the other Tstores in the distributed database system 160 specifying the parameters to be used to generate the join tables. The broadcast message is a single message sent to multiple destinations via the inter-nodal communication link 190. At a block 1326, the secondary node receives the secondary query, which can include the parameters to be used to generate the join tables. In some embodiments, the shared memory router 704 receives the secondary query and makes the corresponding data available to the local Tstores on the node. Once the Tstores receive the secondary query data, at the block 1330 each Tstore builds its join table(s), which will be transmitted to the other Tstores. The secondary query, which can be a SQL query, determines the compare processing that the Tstores perform.

The multiple set query process 1080 continues to a block 1334 at which each Tstore sends its join table(s) to the other Tstores present in the distributed database system 160 via the inter-nodal communication link 190. In some embodiments, the Tstores send the join tables to other Tstores via the shared memory router 610 (or the shared memory router 704 of a secondary node) as described above. The shared memory router 610, 704 receives the incoming join tables and stacks the join tables in its associated memory for access by the Tstores on the node.

At a block 1340, in accordance with the secondary query, each Tstore compares the pivot table to the Tstore's own join table to determine the records, if any, in both tables that satisfy the secondary query. At a block 1344, each Tstore compares the pivot table to the join tables of the other local Tstores that may be present on the same node to determine records in both tables, if any, that satisfy the secondary query. The comparisons at the block 1340 and the block 1344 can be performed while the node is waiting to receive join tables from the Tstores on other nodes that may be present in the distributed database system 160. At a block 1350, each Tstore processes the join tables from the Tstores of other nodes. In one embodiment, the shared memory router 610 (or the shared memory router 704 of a secondary node) makes the received join tables available to its local Tstores in a first in/first out queue.

Once at least one of the join tables are received from another Tstore, at a block 1354 the Tstore compares the pivot table to the join tables received from the other Tstores to determine the records from both the database tables, if any, satisfy the secondary query. The multiple set query process 1080 continues to a block 1360 where each Tstore builds its intermediate results file. Each intermediate results file includes the records that satisfy the secondary query as determined by each Tstore by comparing each of the join tables with that Tstore's portion of the pivot table.

The multiple set query process 1080 continues to a block 1364 where each node sends the intermediate results file for each of the local Tstores present on the node to the primary node 164 via the inter-nodal communication link 190. In some embodiments, the shared memory router 704 of a secondary node receives a pointer to the memory with the intermediate results file from each Tstore at the node. The shared memory router 704 transmits the intermediate results file via the inter-nodal communication link 190 to the shared memory router 610 on the primary node 164 for receipt by the intermediate results file receipt module 618. The shared memory router 610 makes the received intermediate results files available to the primary FEP 620 for gather processing by the final results file delivery module 622.

Continuing to a block 1370, the primary FEP 620 performs gather processing on the intermediate results files. Gather processing can include building a final results file by combining the multiple intermediate results files received from each of the nodes as generated by each of the Tstores. The final results file includes the records that satisfy the secondary query as identified in the multiple intermediate results files that are generated and sent by the nodes for each Tstore.

Continuing to a decision block 1374, the primary FEP 620 determines whether to perform post-processing operations on the final results file. Post-processing operations can include any operations that are performed on the final results file after it is built by the primary FEP 230, for example, ordering records and eliminating duplicate records. If the primary FEP 620 determines at the decision block 1374 that post-processing is to be performed, the multiple set query process 1080 continues to a block 1378 where the final results file post processing module 638 of the primary FEP 620 performs the post-processing operations. After the block 1378, or if the primary FEP 620 determines that post processing is not to be performed, at a block 1380 the primary FEP 620 returns the final results file to the requestor. The multiple set query process 1080 terminates at an end block 1390.

Figure 13:
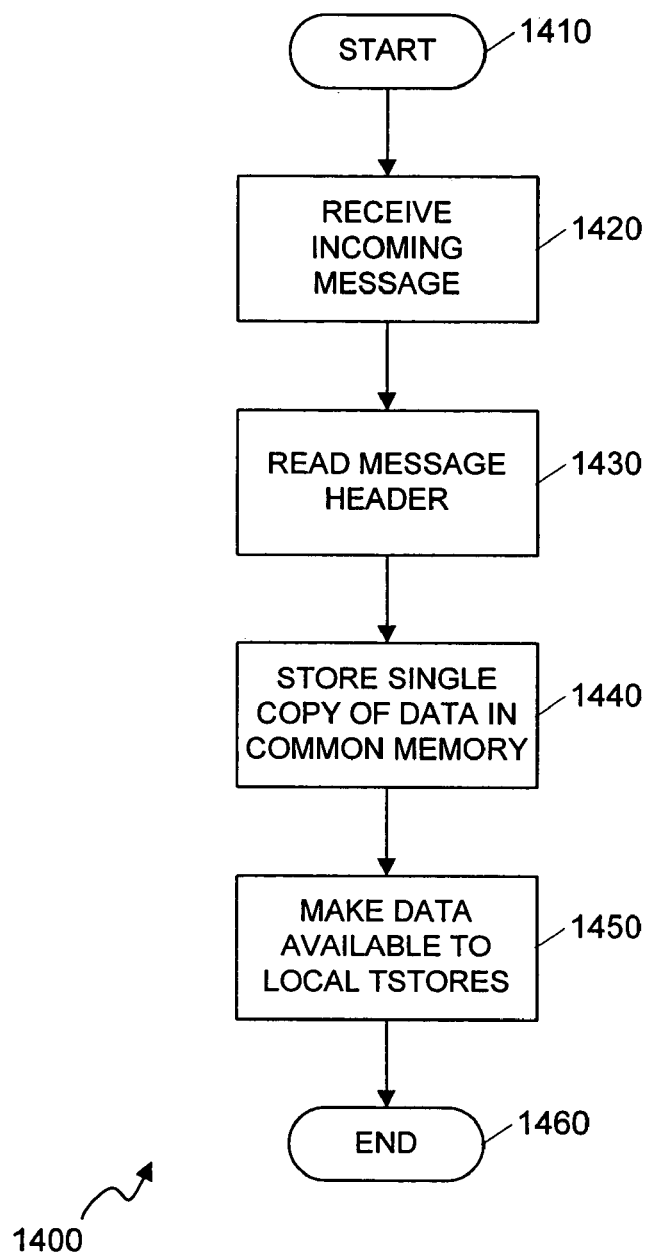
FIG. 13 is a flowchart illustrating a shared memory router process as performed by the shared memory router shown in FIG. 6.

FIG. 13 is a flowchart illustrating a shared memory routing process 1400 as performed by the shared memory router 610 or the shared memory router 704 of a secondary node. For ease of explanation, only the shared memory router 610 is specifically referred to in the following description. In addition, the specific example of a join table being received by the shared memory router 610 is described. As described above, join tables can be used to execute database query commands in the distributed database system 160. One advantage the shared memory router 610 can provide is receiving a single copy of a join table and making it available to multiple Tstores on a node. This reduces the number of messages that are sent between nodes and increases the efficiency and performance of query commands in the distributed database system 160.

The shared memory routing process 1400 begins at a start block 1410. The shared memory routing process 1400 continues to a block 1420 where the shared memory router 610 receives a message from another shared memory router on another node. In some embodiments, the message is in the form of a data packet having a header and a body. The header can include message routing data and the body can include the data to be processed by the Tstores on the receiving node, for example, one or more join tables.

The shared memory routing process 1400 continues to a block 1430 where the shared memory router 610 reads the header of the message and determines the local routing information for the body. For example, a message having a body which is a single copy of a join table can be received and made available (routed) to all of the local Tstores on the receiving node as described below.

The shared memory routing process 1400 continues to a block 1440 where the shared memory router 610 stores a single copy of the body of the incoming message in common memory of the receiving node. At block 1450 the shared memory router 610 makes the single copy of the body in the common memory available to the local Tstores of the receiving node. This can include, for example, sending a message to the local Tstores with a pointer to the location where the body is stored and the size of the body. The shared memory routing process 1400 terminates at an end block 1490.

While the above detailed description has shown, described, and pointed out novel features of the invention as applied to various embodiments, it will be understood that various omissions, substitutions, and changes in the form and details of the device or process illustrated may be made by those of ordinary skill in the technology without departing from the spirit of the invention. This invention may be embodied in other specific forms without departing from the essential characteristics as described herein. For example, although most of the foregoing embodiments are described in the context of distributed database systems, other embodiments of the invention include many types of distributed task systems, for example, systems having disjoint, distributed processing of tasks, jobs, or operations. The embodiments described above are to be considered in all respects as illustrative only and not restrictive in any manner. The scope of the invention is indicated by the following claims rather than by the foregoing description.

What is claimed is:

1. A method of processing a query command in a distributed computing system in which a plurality of database tables are stored on a plurality of nodes, different portions of at least one database table being stored on at least two of the nodes, the method comprising:

storing a first portion of a first database table and a first portion of a second database table on a first node, and storing a second portion of a first database table and a second portion of a second database table on a second node;

determining a join table definition in response to a query command, said join table definition identifying a subset of said first database table to include in executing said database query command;

generating a first join table from said first portion of said first database table in accordance with said join table definition, and generating a second join table from said second portion of said first database table in accordance with said join table definition;

transmitting said first join table to said second node, and transmitting said second join table to said first node;

comparing said first portion of said second database table with said first join table, and comparing said second portion of said second database table with said second join table to generate a first intermediate results file;

comparing said first portion of said second database table with said second join table, and comparing said second portion of said second database table with said first join table to generate a second intermediate results file; and generating a final results file from said first intermediate results file and said second intermediate results file.

2. The method of claim 1, wherein said storing of said first portion of said first database table and said first portion of said second database table on said first node is stored in substantially equal portions.

3. The method of claim 2, wherein said storing of said first portion of said first database table and said first portion of said second database table on said first node is stored in substantially equal portions according to a round robin distribution.

4. The method of claim 3, wherein said storing of said second portion of said first database table and said second portion of said second database table on said second node is stored in substantially equal portions according to a round robin distribution.

5. The method of claim 1, further comprising executing post-processing operations on said final results file.

6. The method of claim 1, wherein said storing of said first portion of said first database table and said first portion of said second database table is stored on a volatile memory of said first node, and said storing of said second portion of said first database table and said first portion of said second database table is stored on a volatile memory of said second node.

7. The method of claim 1, further comprising storing said first and second database tables on a persistent storage device.

8. A distributed database system for processing a database query command in which a plurality of database tables are stored on a plurality of nodes, different portions of at least one database table being stored on at least two of the nodes, the system comprising:
- means for storing a first portion of a first database table and a first portion of a second database table on a first node, and storing a second portion of a first database table and a second portion of a second database table on a second node;
- means for determining a join table definition in response to a database query command, said join table definition identifying a subset of said first database table to include in executing said database query command;
- means for generating a first join table from said first portion of said first database table in accordance with said join table definition, and generating a second join table from said second portion of said first database table in accordance with said join table definition;
- means for transmitting said first join table to said second node, and transmitting said second join table to said first node;
- means for comparing said first portion of said second database table with said first join table, and comparing said second portion of said second database table with said second join table to generate a first intermediate results file;
- means for comparing said first portion of said second database table with said second join table, and comparing said second portion of said second database table with said first join table to generate a second intermediate results file; and
- means for generating a final results file from said first intermediate results file and said second intermediate results file.

9. The system of claim 8, wherein storing of said first portion of said first database table and said first portion of said second database table on said first node comprises storing in substantially equal portions.

10. The system of claim 9, wherein storing of said first portion of said first database table and said first portion of said second database table on said first node comprises storing in substantially equal portions according to a round robin distribution.

11. The system of claim 10, wherein storing of said second portion of said first database table and said second portion of said second database table on said second node comprises storing in substantially equal portions according to a round robin distribution.

12. The system of claim 8, further comprising means for executing post-processing operations on said final results file.

13. The system of claim 8, wherein said means for storing of said first portion of said first database table and said first portion of said second database table comprises a volatile memory of said first node, and said means for storing of said second portion of said first database table and said first portion of said second database table comprises a volatile memory of said second node.

14. The system of claim 8, further comprising means for storing said first and second database tables on a persistent storage device.

15. A method of processing a query command in a distributed computing system in which a plurality of database tables are stored on a plurality of nodes, the method comprising:
- storing a first database table and a second database table on a first node;
- storing a third database table and a fourth database table on a second node;
- determining a first join table definition in response to a query command, said first join table definition identifying a subset of said first database table, and generating a second join table definition in response to said query command, said second join table definition identifying a subset of said third database table;
- generating a first join table from said first database table in accordance with said first join table definition, and generating a second join table from said third database table in accordance with said second join table definition;
- comparing said second database table with said first join table to generate a first intermediate results file;
- comparing said fourth database table with said second join table to generate a second intermediate results file; and
- generating a final results file from said first intermediate results file and said second intermediate results file.

16. The method of claim 15, further comprising executing post-processing operations on said final results file.

17. The method of claim 16, wherein said post-processing operations comprise removing duplicate matching records from said final results file.

18. The method of claim 15, wherein said first database table and said second database table on said first node are stored on a volatile memory of said first node.

19. The method of claim 18, wherein said third database table and said fourth database table are stored on a volatile memory of said second node.

20. The method of claim 15, further comprising storing said first and second database tables on a persistent storage device.

21. The method of claim 20, further comprising storing said third and fourth database tables on a persistent storage device.

* * * * *

(12) EX PARTE REEXAMINATION CERTIFICATE (7068th)
United States Patent
Jardin

(10) Number: US 7,177,874 C1
(45) Certificate Issued: Sep. 15, 2009

(54) SYSTEM AND METHOD FOR GENERATING AND PROCESSING RESULTS DATA IN A DISTRIBUTED SYSTEM

(75) Inventor: Cary A. Jardin, 12662 Sabre View, Cove, San Diego, CA (US) 92128

(73) Assignee: Cary A. Jardin, Poway, CA (US)

Reexamination Request:
No. 90/010,252, Aug. 25, 2008

Reexamination Certificate for:
Patent No.: 7,177,874
Issued: Feb. 13, 2007
Appl. No.: 10/808,177
Filed: Mar. 23, 2004

Related U.S. Application Data

(63) Continuation-in-part of application No. 10/345,811, filed on Jan. 16, 2003, now abandoned, and a continuation-in-part of application No. 10/345,504, filed on Jan. 16, 2003, now abandoned.

(51) Int. Cl.
*G06F 17/00* (2006.01)

(52) U.S. Cl. ............................ 707/100; 707/1; 707/6; 707/103 R; 707/200

(58) Field of Classification Search .................. None
See application file for complete search history.

(56) References Cited

U.S. PATENT DOCUMENTS

| | | | |
|---|---|---|---|
| 5,548,770 A | 8/1996 | Bridges | |
| 5,613,142 A | 3/1997 | Matsumoto | |
| 5,701,400 A | 12/1997 | Amado | |
| 5,903,893 A | 5/1999 | Kleewein et al. | |
| 5,937,042 A | 8/1999 | Sofman | |
| 6,339,769 B1 | 1/2002 | Cochrane et al. | |
| 6,397,227 B1 | 5/2002 | Klein et al. | |
| 6,411,313 B1 | 6/2002 | Conlon et al. | |
| 6,564,221 B1 | 5/2003 | Shatdal | |
| 6,665,684 B2 | 12/2003 | Zait et al. | |
| 6,732,107 B1 | 5/2004 | Luo et al. | |
| 6,745,198 B1 | 6/2004 | Luo et al. | |
| 6,804,678 B1 | 10/2004 | Luo et al. | |
| 6,954,776 B1 | 10/2005 | Cruanes et al. | |
| 7,085,769 B1 | 8/2006 | Luo et al. | |
| 7,092,954 B1 | 8/2006 | Ramesh | |
| 7,111,010 B2 | 9/2006 | Chen | |
| 2002/0138582 A1 | 9/2002 | Chandra et al. | |

OTHER PUBLICATIONS

Dewitt, David J., "The Gamma Database Machine Project", IEEE Transactions on Knowledge and Database Engineering 2, No. 1, 44–62 (Mar. 1990).

Baru et al., "DB2 Parallel Edition," IBM Systems Journal, vol. 34, No. 2, pp. 292–322 (1995).

Ozsu and Valduriez, *Principles of Distributed Database Systems*, pp. 430–432, 436–441, Printice–Hall Inc., ($2^{nd}$ ed. 1999).

*Primary Examiner*—Christopher E Lee

(57) ABSTRACT

Embodiments of the systems and methods provide the superior performance of high-speed distributed processing in a clustered system environment. The distributed computing system stores data tables or distributes jobs or tasks on multiple processors that execute on one or more nodes. For the case of multiple nodes, the nodes communicate over an inter-nodal communication link, for example, via a proprietary communication protocol, or alternatively via a standard protocol such as a SQL database command protocol. By distributing the data storage and task processing over a potentially large number of processors and nodes, the distributed computing system returns processing results to the requestor in significantly reduced times as compared to conventional computing systems.

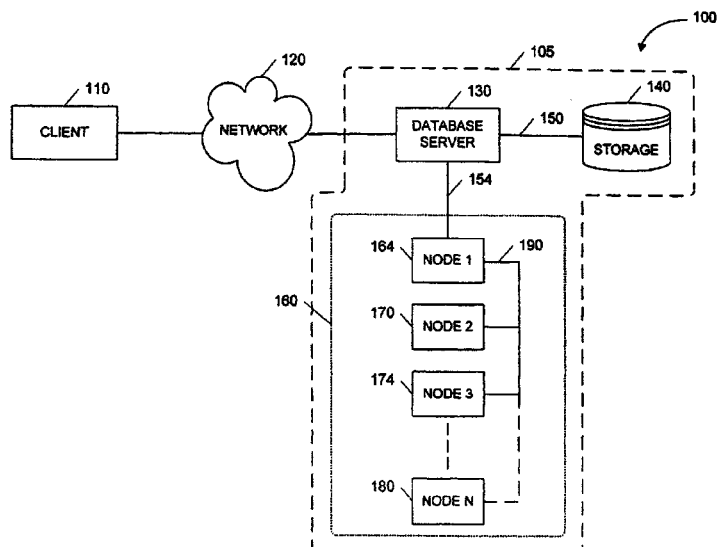

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–21 is confirmed.

* * * * *